(12) United States Patent
Mercer

(10) Patent No.: US 12,499,499 B2
(45) Date of Patent: Dec. 16, 2025

(54) MULTI-TENANT SYSTEM FOR CONSOLIDATED USER SERVICES

(71) Applicant: PAYGROUND, INC., Gilbert, AZ (US)

(72) Inventor: Drew Mercer, Gilbert, AZ (US)

(73) Assignee: PAYGROUND, INC., Gilbert, AZ (US)

( * ) Notice: Subject to any disclaimer, the term of this patent is extended or adjusted under 35 U.S.C. 154(b) by 310 days.

(21) Appl. No.: 17/566,543

(22) Filed: Dec. 30, 2021

(65) Prior Publication Data

US 2022/0207616 A1    Jun. 30, 2022

Related U.S. Application Data

(63) Continuation-in-part of application No. PCT/US2020/067549, filed on Dec. 30, 2020.

(51) Int. Cl.
| | |
|---|---|
| *G06Q 10/00* | (2023.01) |
| *G06Q 10/10* | (2023.01) |
| *G06Q 40/08* | (2012.01) |
| *G06Q 50/22* | (2018.01) |
| *G16H 10/60* | (2018.01) |
| *G16H 15/00* | (2018.01) |

(52) U.S. Cl.
CPC ............ *G06Q 50/22* (2013.01); *G06Q 10/10* (2013.01); *G06Q 40/08* (2013.01); *G16H 10/60* (2018.01); *G16H 15/00* (2018.01)

(58) Field of Classification Search
CPC ........ G06Q 50/22; G06Q 10/10; G06Q 40/08; G16H 10/60; G16H 15/00
See application file for complete search history.

(56) References Cited

U.S. PATENT DOCUMENTS

| | | | |
|---|---|---|---|
| 9,419,951 B1 | 8/2016 | Felsher et al. | |
| 10,325,249 B2 * | 6/2019 | Dennison | G06Q 20/102 |

(Continued)

OTHER PUBLICATIONS

International Search Report for PCT/US2020/067549 dated Mar. 31, 2021 (2 pages).

(Continued)

*Primary Examiner* — Rajesh Khattar
(74) *Attorney, Agent, or Firm* — FULLER IP LAW LLC; Bryce W. Burnham

(57) ABSTRACT

A method performed by multi-tenant system for consolidated user services (MTSCUS) may include receiving invoice information for multiple patients sent from multiple providers, comprising separately created invoices for their multiple patients, identifying invoices received from the multiple providers that identify patient invoices for each of the multiple patients for healthcare providers both enrolled and not enrolled to receive payment, creating, with an intelligent notification system, an invoice notification plan tailored to each of the multiple patients, displaying invoices to each of the multiple patients, and receiving and directing payment from each of the multiple patients to accounts of the multiple healthcare providers for each of the invoices for each of the multiple patients, wherein healthcare providers enrolled to receive electronic payment are sent electronic payment and healthcare providers not enrolled to receive electronic payment are sent a check.

20 Claims, 16 Drawing Sheets

(56) References Cited

U.S. PATENT DOCUMENTS

| | | |
|---|---|---|
| 2012/0005091 A1* | 1/2012 | Pitroda .............. H04L 63/0838 |
| | | 705/39 |
| 2012/0109668 A1 | 5/2012 | Pitroda et al. |
| 2012/0239560 A1* | 9/2012 | Pourfallah ........... G06Q 20/102 |
| | | 705/40 |
| 2014/0052623 A1 | 2/2014 | Pitroda et al. |
| 2014/0067690 A1 | 3/2014 | Pitroda et al. |
| 2014/0222594 A1 | 8/2014 | Rose et al. |
| 2017/0061091 A1* | 3/2017 | McElhinney .......... G16H 10/60 |
| 2020/0211137 A1* | 7/2020 | Mercer ................. G16H 10/60 |

OTHER PUBLICATIONS

Written Opinion of the International Searching Authority for PCT/US2020/067549 dated Mar. 31, 2021 (6 pages).

\* cited by examiner

MULTI-TENANT SYSTEM FOR CONSOLIDATED USER SERVICES

RELATED APPLICATIONS

This application claims priority to, and is a continuation-in-part of, the Patent Cooperation Treaty (PCT) Application No. PCT/US20/67549, entitled "Multi-Tenant System for Consolidated User Services," which was filed Dec. 30, 2020 and claims priority to, and is a continuation-in-part of U.S. application Ser. No. 16/730,084, filed Dec. 30, 2019, titled "Healthcare Payment Aggregation System," the entirety of the disclosures of which are hereby incorporated by this reference.

TECHNICAL FIELD

Aspects of this document relate generally to a multi-tenant system ("MTS") or platform for providing or facilitating consolidated user services ("CUS"), such as a multi-tenant system for consolidated user services ("MTSCUS") a healthcare payment aggregation system for healthcare providers and patients.

BACKGROUND

A patient may interact with many healthcare providers to receive the best medical care. Indeed, some patients may interact with 10 or more healthcare providers. These healthcare providers may include primary care physicians, specialists (e.g., neurologist and rheumatologists), physical therapists, hospitals, laboratories, and so on. These healthcare providers may not be affiliated with each other, and may even be direct competitors. As a result, each healthcare provider may, and often will, send its own invoices to its patients. Even what may appear to a patient to be single healthcare provider may, in fact, actually be multiple healthcare providers. For example, a hospital may have emergency room physicians, surgeons, physical therapists, radiologists, and so on, who are each affiliated with different organizations, each of which sends its own invoices to patients.

A patient who receives many invoices from many healthcare providers may have difficulty keep track of what invoices have been paid and when the invoices have been paid. As a result, patients may not pay their invoices in a timely manner. To help patients keep track of their invoices, to improve cash flow, and to avoid the cost of paper invoices, many healthcare providers provide portals (e.g., web sites) through which their patients can track their invoices and make payments. The healthcare providers may send electronic notifications (e.g., emails and text messages) to patients when an invoice is issued and past due. Although a portal can be convenient for a patient, if a patient interacts with many healthcare providers, the patient may find it very inconvenient to have to access multiple portals to pay their healthcare invoices.

SUMMARY

In an aspect, a method performed by a multi-tenant system for consolidated user services configured as a healthcare billing and payment aggregation service may comprise receiving invoice information for multiple patients sent from multiple providers. The multiple providers may comprise healthcare providers and patient representatives. The invoice information received may comprise separately created invoices for their multiple patient. The invoice information may include invoices that each identify a patient and an amount due. The method may include identifying invoices received from the multiple providers that identify patient invoices for each of the multiple patients for healthcare providers both enrolled and not enrolled to receive payment. Identifying invoices may further comprise consolidating information specific to each of the multiple patients from isolated tenancies specific to each of the multiple healthcare providers. The method may include, creating, with an intelligent notification system, an invoice notification plan tailored to each of the multiple patients. Each invoice notification plan may be customized to account for a notification history, a payment history, a preference for electronic invoices, paper invoices, or both, and payment pattern of the patient with multiple healthcare providers. The method may include displaying invoices to each of the multiple patients, according to the notification plan for each of the multiple patients, with an indication of the healthcare provider and an amount due for each of the invoices for each of the multiple patients. The method may include receiving and directing payment from each of the multiple patients to accounts of the multiple healthcare providers for each of the invoices for each of the multiple patients. Healthcare providers may be enrolled to receive electronic payment and healthcare providers not enrolled to receive electronic payments may be sent a check.

The method may further comprise a method wherein each invoice notification plan is customized to account for a notification history, a payment history, a preference for electronic invoices, paper invoices, or both, and a payment pattern of the patient with multiple healthcare providers. The method may further comprise notifying each of the plurality of healthcare providers of the payment of each of the invoices by each of the multiple patients. The electronic transfer of funds may come from a check processor different than an institution listed on the check by the payor. The check processor may be a third-party check processor. Receiving and detecting payment for at least one of the invoices may be made in more than one payments as part of a financing plan. The multiple healthcare providers for each of the invoices for each of the multiple patients may receive payment due from the invoice notification plan by the electronic transfer of funds, and the third-party check processor may receive an amount of funds designated by the check from the check payor to offset the electronic transfer of funds advanced by the check processor to the payee. The electronic transfer of funds in lieu of the check may be less than a check amount, and the difference between an amount of the electronic transfer and the check amount may cover a processing fee of the check processor. The method may further comprise receiving from another user a request to pay a patient-provided invoice that has not been received from a specified healthcare provider by the healthcare payment aggregation service. The request may identify a payment amount and the specified healthcare provider. The method may include directing that payment for the payment amount due be transferred from an account of the other user to an account of the specified healthcare provider. The specified healthcare provider may be notified of the payment for the patient-provided invoice. The method may include directing that payment for the amount due of the specified invoice be transferred from an account of the user to an account of the specified healthcare provider when a user specifies to automatically pay invoices of a specified healthcare provider after a specified invoice for the specified healthcare provider is received. The specified healthcare provider may be notified of the payment.

In another aspect, a method performed by a multi-tenant system for consolidated user services configured as a healthcare billing and payment aggregation service may comprise receiving invoice information for multiple patients sent from multiple providers. The invoice information received may comprise separately created invoices for their multiple patients. The invoice information may include invoices that each identify a patient and an amount due. The method may include identifying invoices received from the multiple providers that identify patient invoices for each of the multiple patients for healthcare providers both enrolled and not enrolled to receive payment. The method may include creating, with an intelligent notification system, an invoice notification plan tailored to each of the multiple patients. The method may include displaying invoices to each of the multiple patients, according to the notification plan for each of the multiple patients, with an indication of the healthcare provider and an amount due for each of the invoices for each of the multiple patients. The method may include receiving and directing payment from each of the multiple patients to accounts of the multiple healthcare providers for each of the invoices for each of the multiple patients. Healthcare providers enrolled to receive electronic payment may be sent electronic payment, and healthcare providers not enrolled to receive electronic payment may be sent a check.

The method may further comprise each invoice notification plan being customized to account for a notification history, a payment history, a preference for electronic invoices, paper invoices, or both, and a payment pattern of the patient with multiple healthcare providers. The method may comprise notifying each of the plurality of healthcare providers of the payment of each of the invoices by each of the multiple patients. The electronic transfer of funds may come from a check processor different than an institution listed on the check by the payor. The check processor may be a third-party check processor. The multiple healthcare providers for each of the invoices for each of the multiple patients may receive payment due from the invoice notification plan by the electronic transfer of funds. The third-party check processor may receive an amount of funds designated by the check from the check payor to offset the electronic transfer of funds advanced by the check processor to the payee. The electronic transfer of funds in lieu of the check may be less than a check amount, wherein the difference between an amount of the electronic transfer and the check amount covers a processing fee of the check processor. The method may further comprise receiving from another user a request to pay a patient-provided invoice that has not been received from a specified healthcare provider by the healthcare payment aggregation service, the request identifying a payment amount and the specified healthcare provider. The method may include directing that payment for the payment amount due be transferred from an account of the other user to an account of the specified healthcare provider. The method may include notifying the specified healthcare provider of the payment for the patient-provided invoice. The method may include directing that payment for the amount due of the specified invoice be transferred from an account of the user to an account of the specified healthcare provider when a user specifies to automatically pay invoices of a specified healthcare provider after a specified invoice for the specified healthcare provider is received. The method may include notifying the specified healthcare provider of the payment. The multiple providers sending invoice information may comprise healthcare providers and patient representatives. Receiving and detecting payment for at least one of the invoices may be made in more than one payments as part of a financing plan. Identifying invoices received from the multiple providers may comprise consolidating information specific to each of the multiple patients from isolated tenancies specific to each of the multiple healthcare providers.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the description and figures included herein.

DETAILED DESCRIPTION

Figure 1:
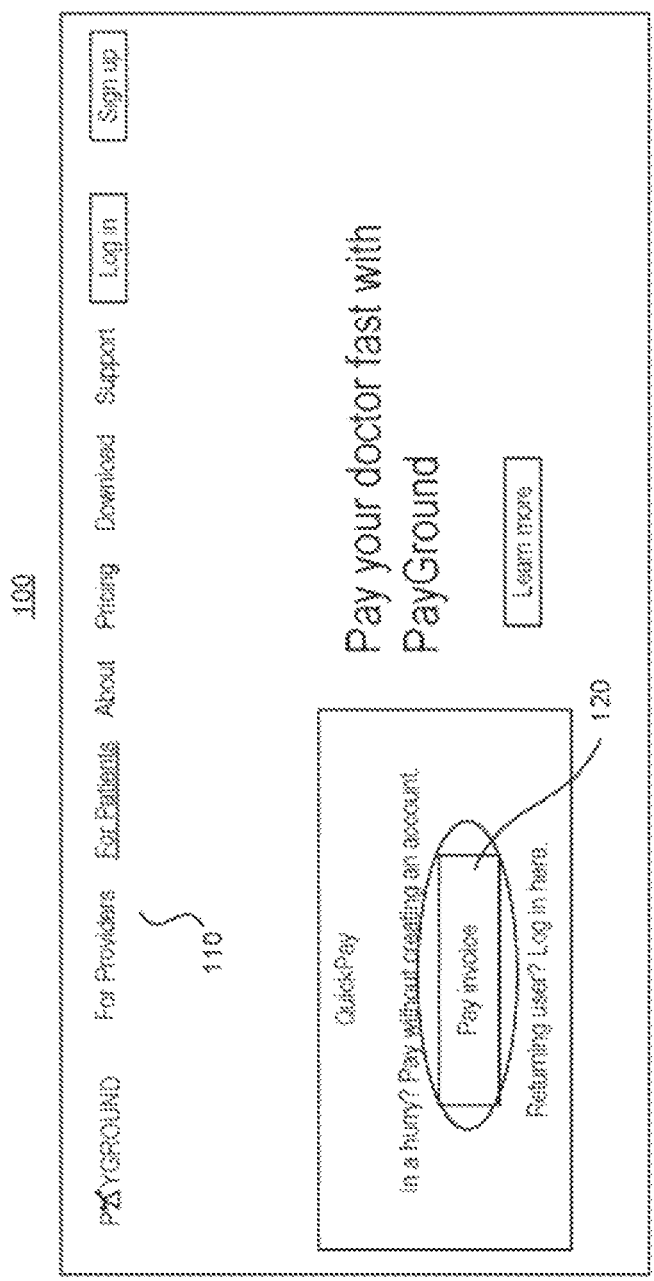
FIG. 1 illustrates a display page for a patient to pay an invoice without having to log in to a healthcare provider payment aggregation ("HPPA") system in some embodiments.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Methods and systems are provided for a MTSCUS. In some instances, the multi-tenant system may be used in, applied to, or operate within the healthcare space, although other industries may also benefit from the MTSCUS. When the MTSCUS is directed to healthcare services, HPPA, or both, the multi-tenants may comprise multiple healthcare providers and the system may consolidate services for multiple patients or users. For ease of exposition and brevity of description, some scenarios are described in terms of healthcare providers and patients, HPPA, and healthcare provider payment ("HPP") systems, but a person of ordinary skill in the art (POSA) will understand that such exposition and explanation is by way of illustration, and not by way of limitation.

MTSCUS may comprise aggregating patient invoice and payment information of multiple healthcare providers who are not affiliated with each other. In some embodiments, a HPPA system of an HPPA service provides patients with access to invoices of the healthcare providers (even unaffiliated healthcare providers) that provide services to the patients. For example, if a patient receives medical services at both a hospital and a clinic that is unaffiliated with the hospital, the patient can view invoices from both medical providers via a patient interface provided by the HPPA system. The HPPA system also provides payment processing service for the invoices. Continuing with the example, when the patient indicates to pay an invoice of the hospital, the HPPA system may use stored credit card information to make the payment to the hospital on behalf of the patient. Similarly, the HPPA system can use the stored credit card information to make a payment to the clinic. A payment can be made when manually requested by a patient or via an automatic payment feature.

In some embodiments, the HPPA system 1010 (which as used herein may more broadly be understood as a MTSCUS 1200) receives invoice information sent from healthcare providers or HPP systems 1020 (system tenants 1230, 1240), who are registered with the HPPA system 1010 (and comprise isolated tenancies or tenancies 1212. The invoice information may be sent by an HPPA application that executes on a computer system of a healthcare provider 212 and that provides invoice and payment services to the healthcare provider. The HPPA application may alternatively execute on a computer system controlled by the HPPA service (e.g., cloud-based) that provides a webpage patient experience. Alternatively, the invoice information may be sent by an HPPA interface client that executes on the computer system of the healthcare provider and that interfaces with an existing invoice and payment system of the healthcare provider. The invoice information includes invoices that identify the patient and the amount due. The invoices may also identify the healthcare provider, an invoice identifier (e.g., invoice number), a service date, a due date, a description of the service, and so on.

When the HPPA system receives a request from a patient to access their invoices, the HPPA system identifies invoices received from healthcare providers 212 that identify the patient as the patient. For example, the patient may be identified by a government issued identifier, full name along with address and date of birth, and so on. The HPPA system may then display invoice information for each invoice (e.g., pending invoice) for the patient. When the HPPA system receives from the patient an instruction to pay the amount due of a designated (e.g., selected) invoice of a displayed invoice, the HPPA system directs payment of the amount due (or another amount) of the designated invoice be transferred from an account of the patient to an account of the healthcare provider of the designated invoice. The HPPA system then notifies the healthcare provider of the payment. The healthcare provider can be notified immediately after the payment is completed or notified periodically (e.g., nightly) along with other payment notifications. The HPPA system also provides various reports to the healthcare providers such as pending invoices, paid invoices, average time to payment, overdue invoices, and so on.

The service provided by the HPPA system that allows for healthcare providers 212 to send their invoices (or more precisely accounts-receivable information) to the HPPA system and receive payments for those invoices is referred to automatic reconciliation service. The HPPA system provides the automatic reconciliation only to healthcare providers who are registered for that service. A healthcare provider can alternatively register for a manual reconciliation service. With a manual reconciliation service, the healthcare provider does not provide invoices to the HPPA system. Rather, a patient provides invoice information (identifying the healthcare provider and invoice) to the HPPA system, and the HPPA system directs payment of the invoice on behalf of the patient. The invoices of the manual reconciliation service are referred to as patient-provided invoices because they are provided by the patient and not the healthcare provider. With the manual reconciliation service, the HPPA system also notifies the healthcare provider of the payment.

In some embodiments, the HPPA system provides a patient interface that allows patients to effectively monitor and pay their invoices. The HPPA system provides a dashboard display page that identifies one or more pending invoices of different healthcare providers 212. The dashboard display page also identifies recent payments to the healthcare providers and may provide payment statistics (e.g., total payments to each healthcare provider). The HPPA system provides an "invoices pending" or "pending invoices" display page through which the patient can review all pending invoices including invoices from different healthcare providers and pay the invoices. The HPPA system provides a healthcare provider display page through which a patient can review authorized healthcare providers for which the patient has authorized the HPPA system to receive invoices of the patient and through which the patient can authorize and de-authorized healthcare providers.

In some embodiments, the HPPA system may also provide an intelligent notification system to both prevent a patient from feeling overwhelmed by the notifications and improve the speed of payments. The intelligent notification system may allow each healthcare provider to establish its own notification plan for its patients. For example, one healthcare provider may establish a notification plan to send two electronic notifications (e.g., two weeks apart) followed by paper notifications until a patient is made, and another healthcare provider may send four electronic notifications followed by paper notifications. The intelligent notification system may provide a healthcare provider with the option of allowing the intelligent notification system to automatically establish a notification plan that is tailored to each patient. The intelligent notification system can use knowledge of the notification history of a patient with multiple healthcare providers and payment history (e.g., payment patterns) to select a notification plan that is likely to be effective for a patient. For example, if a patient only pays an invoice after receiving a paper notification, the intelligent notification system may establish a notification plan for that patient that only sends paper notifications. In contrast, if a patient tends to pay an invoice after three electronic notifications, the intelligent notification system may send three (or four) electronic notifications to that patient before sending a paper notification. In such a case, the intelligent notification system may reduce the time between electronic notifications, for example, from two weeks to 10 days to encourage faster payment. The intelligent notification system may use various algorithms for establishing a notification plan for a patient which may include establishing a notification plan specifically designed to learn the payment behavior of a patient. For example, an algorithm may establish an initial notification plan that sends five electronic notifications and then paper notifications (and possibly subsequent electronic notifications). If a patient tends to pay invoices after three electronic notifications, the algorithm may adjust the notification plan to send only three electronic notification followed by paper notifications. If a patient does not even respond after five electronic notifications, the algorithm may skip electronic notifications and immediately send a paper notification. Also, the algorithm may also establish a notification plan that factors in the history of the timing when a patient makes payments. For example, if a patient tends to pay invoices on the second day of a month, the algorithm may send an electronic notification on the first day of the month. As another example, if a patient tends to pay invoices two days after the initial electronic notification, the algorithm may send the second electronic invoice five days later rather than the standard 10 days later.

Although the HPPA system is described primarily in the context of invoices relating to service providers that are healthcare providers 212, the HPPA system (or more generally, a service provider payment aggregation system) can be used to aggregate payment information for many different types of service providers that provide services to service recipients (e.g., customers or other individuals, organizations, and persons responsible to pay invoices for services provided for a service recipient). For example, the service providers may include attorneys, accountants, photographers, gardeners, pool cleaners, housekeepers, and so on.

FIG. 1 illustrates a display page for a patient to pay an invoice without having to log in (e.g., a patient without an account) to the HPPA system in some embodiments. A display page 100 includes selection options 110 that indicate the user has specified that they are a patient. To pay an invoice without having to log in, the patient can select the pay invoice button 120.

Figure 2:
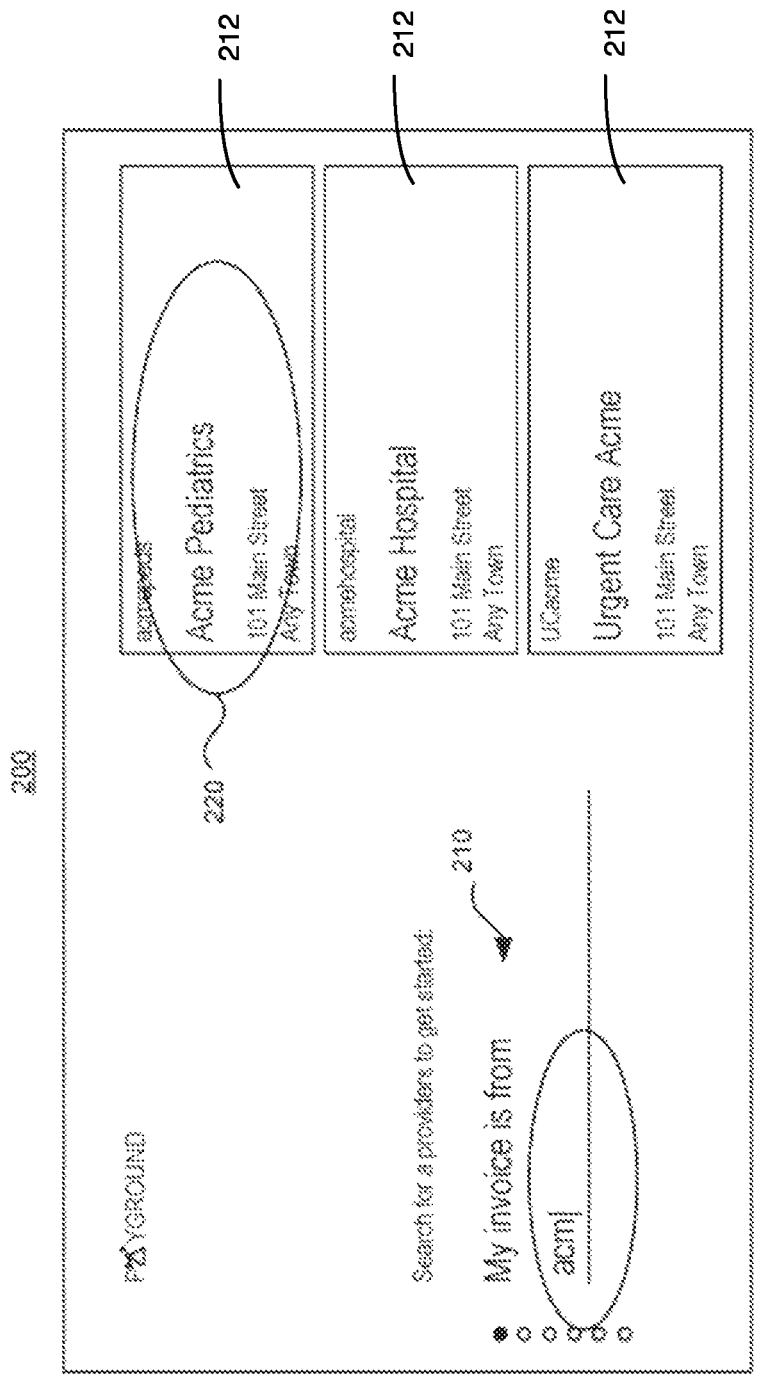
FIG. 2 illustrates a display page for a patient to pay an invoice in some embodiments.

FIG. 2 illustrates a display page for a patient to pay an invoice in some embodiments. A display page 200 includes a provider selection field 210 and a predictive matches area 220. As the patient starts to enter the name of a healthcare provider 212, the predictive matches are updated. The patient can then select one of the healthcare providers of the predictive matches.

Figure 3:
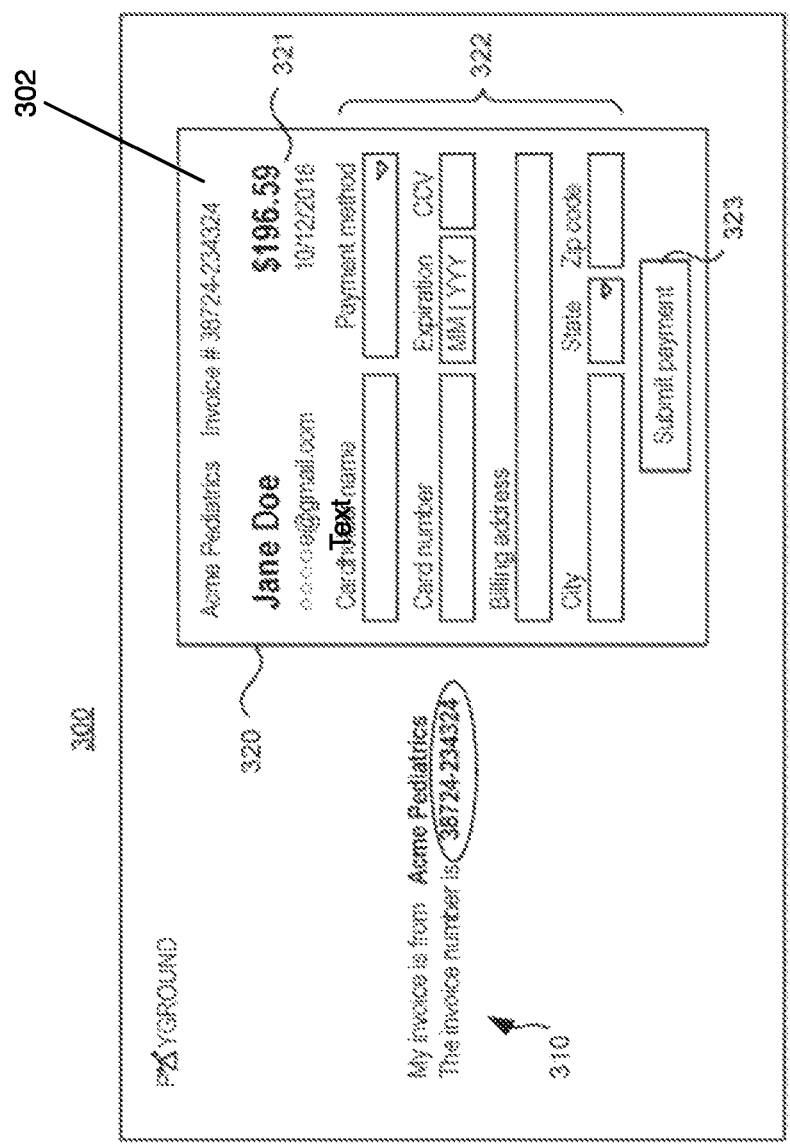
FIG. 3 illustrates a display page for a patient whose provider is signed up for automatic reconciliation is registered to pay an invoice in some embodiments.

FIG. 3 illustrates a display page for a patient whose provider is signed up for automatic reconciliation is registered to pay an invoice in some embodiments. A display page 300 displays invoice number field 310 and invoice payment information box 320. The HPPA system may also brand the various display pages with names and logo of the providers. For example, since the provider is known to be Acme Pediatrics, the HPPA system may add a logo for Acme Pediatrics to the top of display page 300. When a patient enters the invoice number of the invoice to be paid, the HPPA system checks its database (or data stores) to determine whether an invoice with that invoice number for the selected healthcare provider has been received. If so, the HPPA system populates the invoice payment information box 320 with information such as patient name, patient email address, and invoice amount 321. The patient can enter credit card information into the credit card boxes 322, or the credit card boxes may be prepopulated when the patient has an account with the HPPA system. When the patient selects the submit payment button 323, the HPPA system directs payment of the invoice and notifies the healthcare provider.

Figure 4:
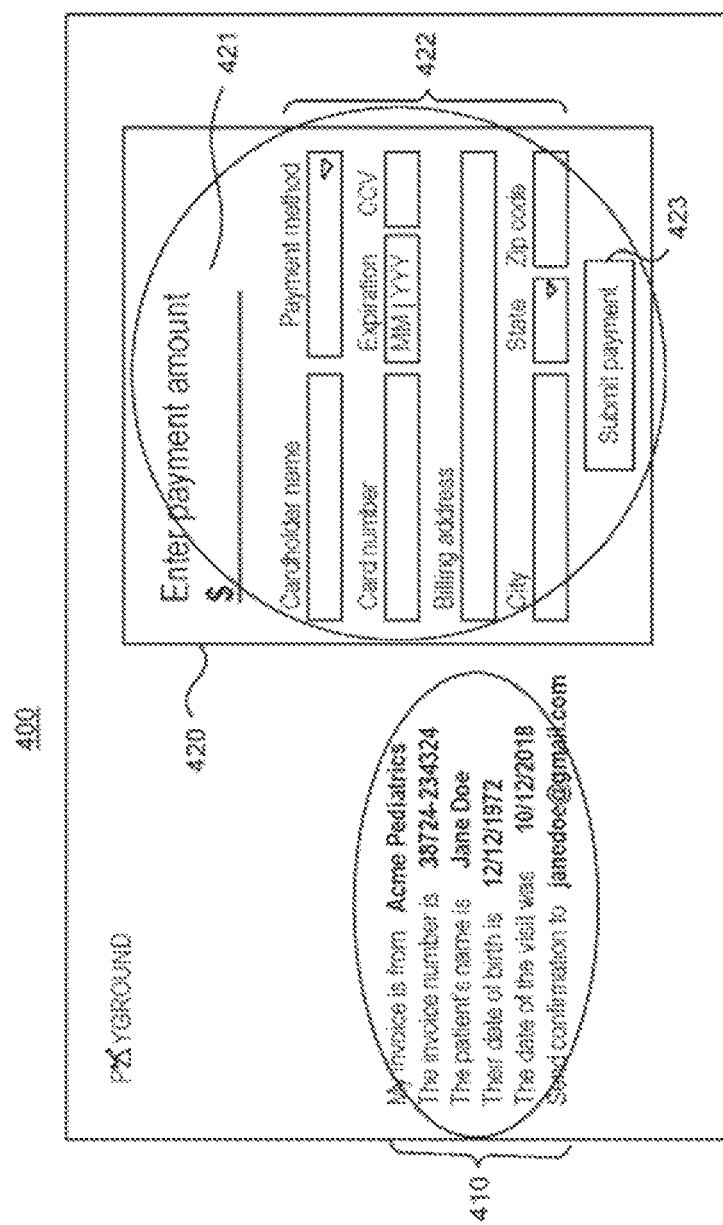
FIG. 4 illustrates a display page for a patient whose provider is not signed up for automatic reconciliation in some embodiments.

FIG. 4 illustrates a display page for a patient whose provider is not signed up for automatic reconciliation in some embodiments. If an invoice with the invoice number entered on display page 200 has not been received from the selected healthcare provider, then the HPPA system displays display page 400 that includes fields 410 for entering the patient name, date of birth, date of visit, and email address. After the patient enters this information, the HPPA system displays an invoice payment box 420 that allows the patient to enter the payment amount 421 and credit card information 422. The patient can then select the submit button 423 to authorize payment.

Figure 5:
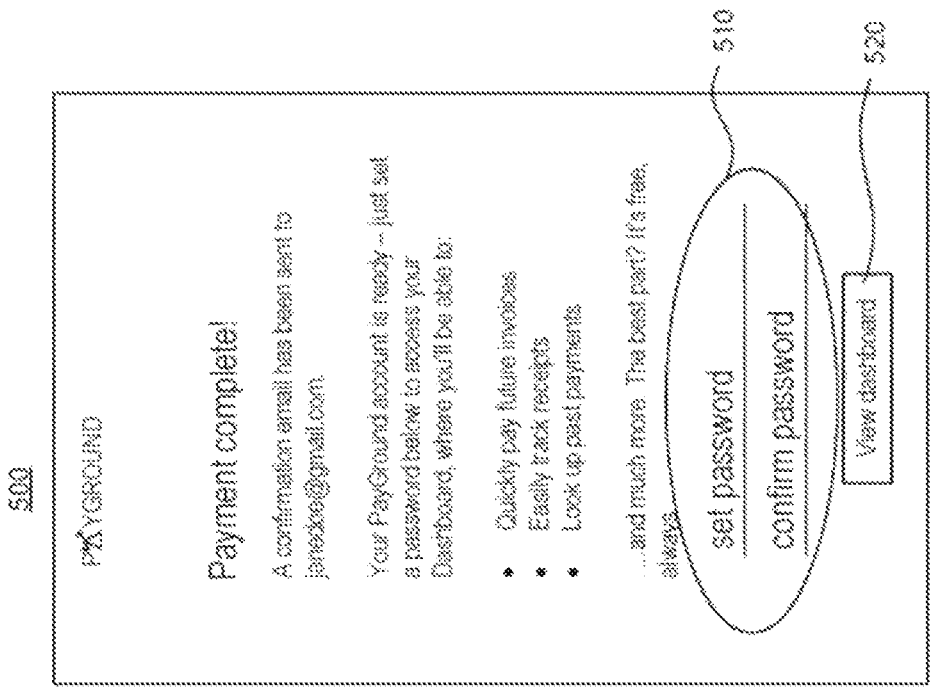
FIG. 5 illustrates a display page for confirming payment in some embodiments.

FIG. 5 illustrates a display page for confirming payment in some embodiments. A display page 500 identifies the patient's email that is used to identify the patient and provides a password entry field 510. If the patient is not registered with the HPPA system, the patient can register by entering a password for the registration. The patient then selects a button 522 the dashboard display page. The HPPA system also provides a separate registration process so a patient can register prior to making a payment.

Figure 6:
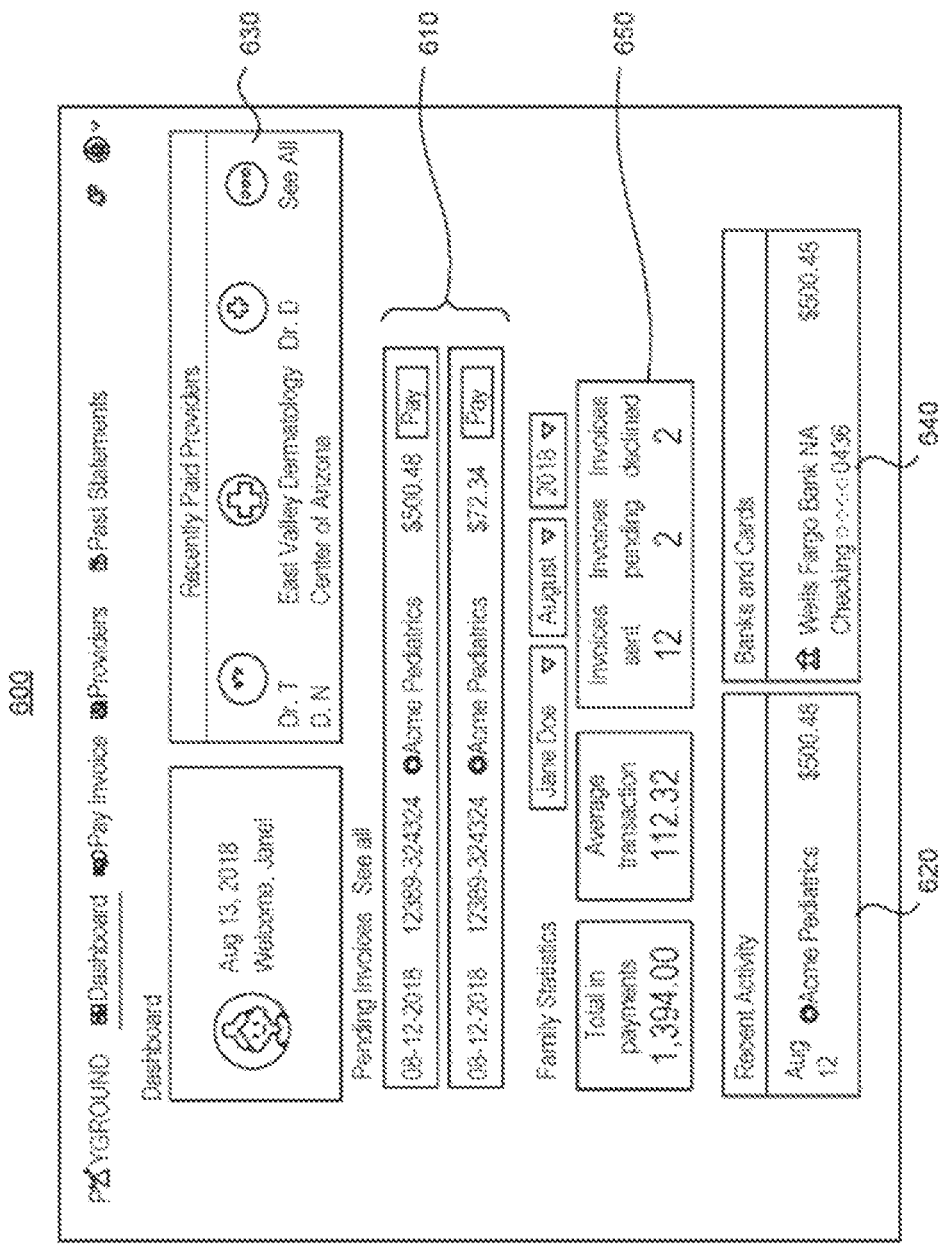
FIG. 6 illustrates a dashboard display page for a patient in some embodiments.

FIG. 6 illustrates a dashboard display page for a patient in some embodiments. A dashboard display page 600 includes a pending invoice section 610, a recent activity section 620, a recently paid healthcare provider section 630, a registered payment section 640, and payment statistics 650. The pending invoice section lists at least some of the pending invoices, which may include the most recent invoices or past due invoices. The recent activity section lists recent payments by the patient. The recently paid healthcare provider section list healthcare providers to whom payments have recently been made. The registered payment section lists registered payment information such as credit card information. The payment statistics information displays statistics about patient invoices and payments such as total payments made in the last year.

Figure 7:
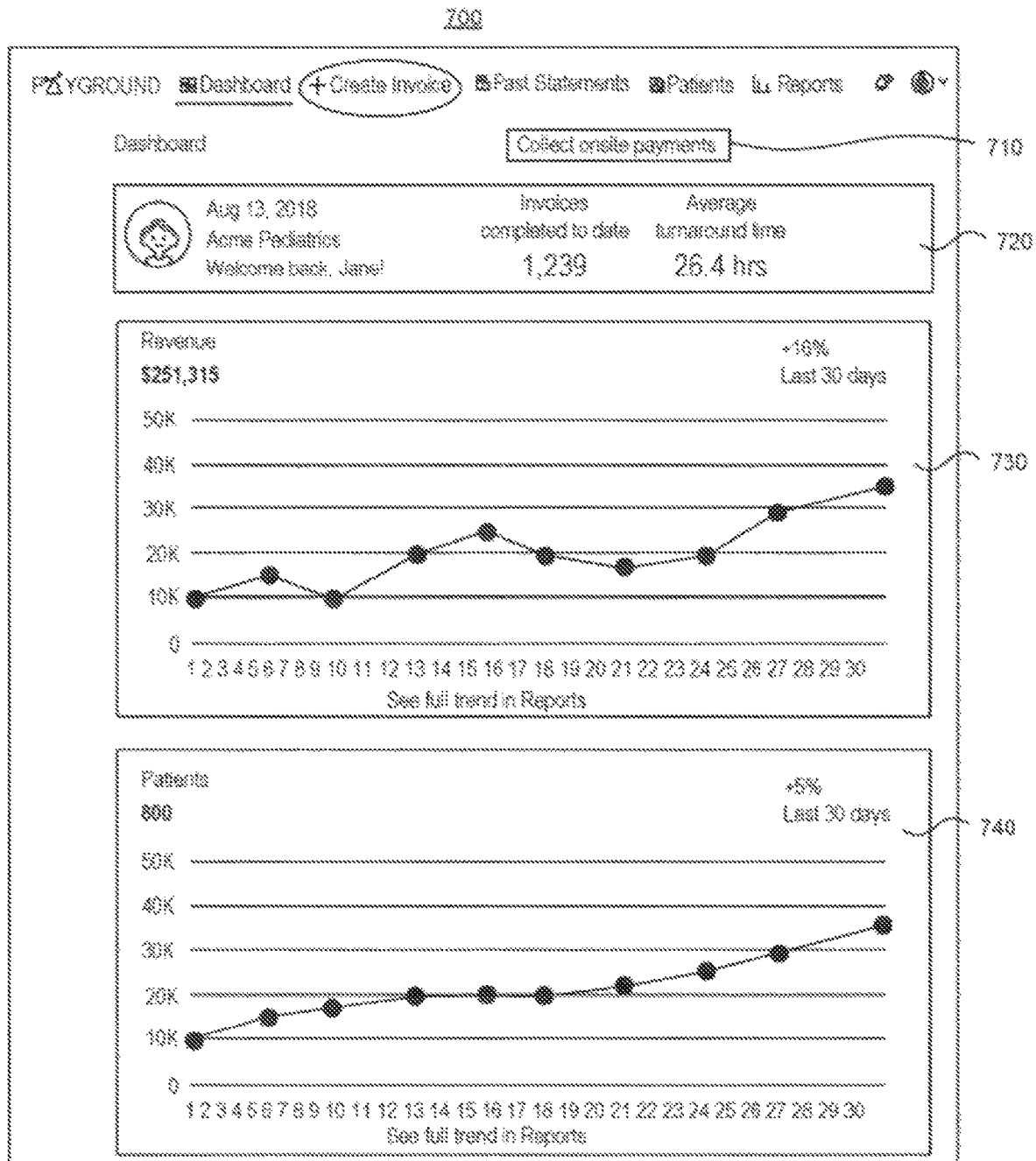
FIG. 7 illustrates a dashboard display page for a healthcare provider in some embodiments.

FIG. 7 illustrates a dashboard display page for a healthcare provider in some embodiments. A dashboard display page 700 includes a collect on-site payment button 710, a statistic area 720, and graphs 730 and 740. A healthcare provider selects the collect on-site payment button to record a payment made by the patient on-site at a medical facility directly to the healthcare provider. The statistics area displays various statistics relating to the healthcare provider such as such as the number of invoices that have been paid. The graphs illustrate revenue information and patient payment information.

Figure 8:
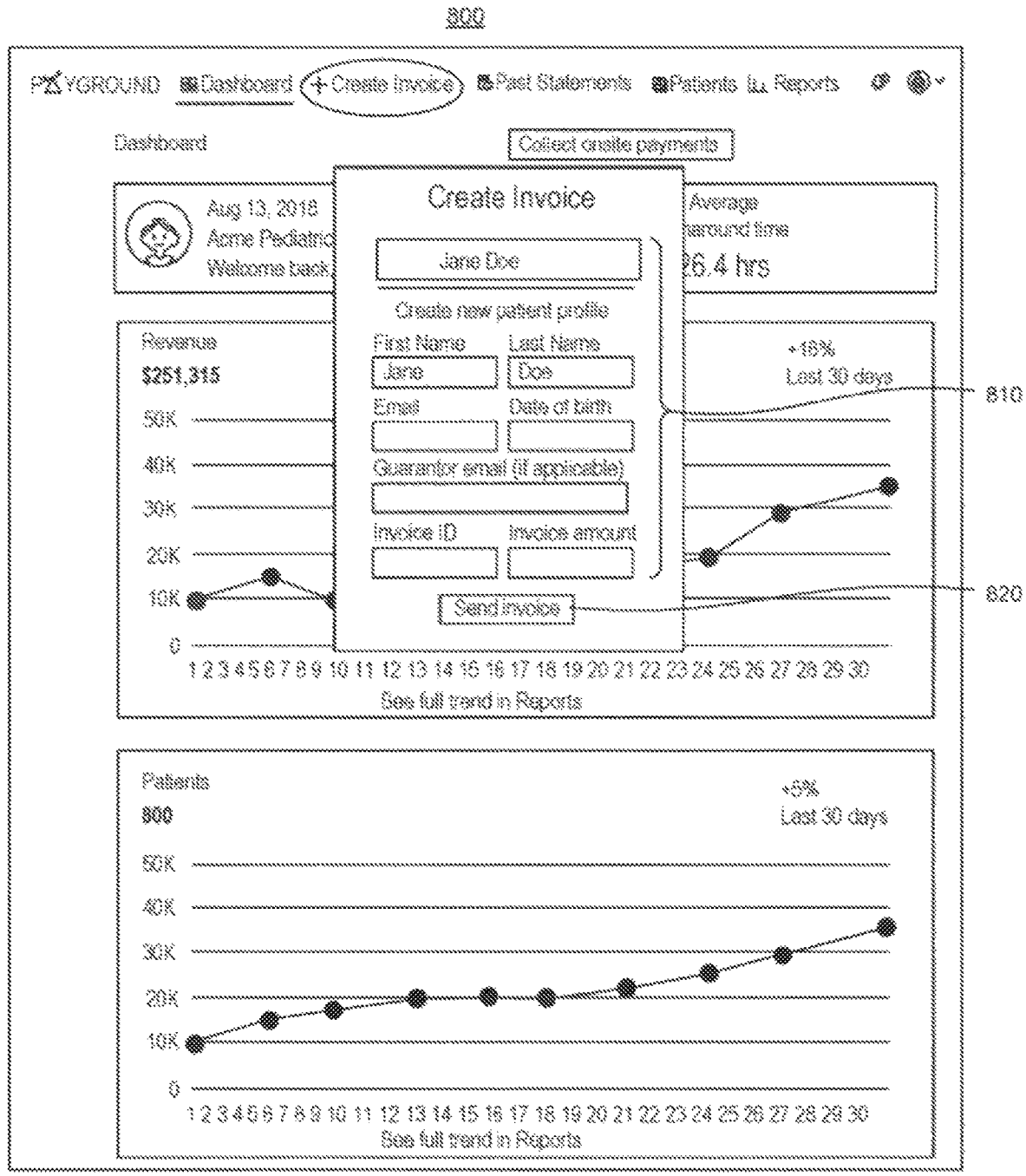
FIG. 8 illustrates a create invoice display page in some embodiments.

FIG. 8 illustrates a create invoice display page in some embodiments. A create invoice display page 800 includes data entry fields 810 and a send invoice button 820. If a patient has already paid an invoice to the provider, the provider can select a patient to display all the fields except for the invoice amount. The healthcare provider then enters the invoice amount and selects the send invoice button.

Figure 9:
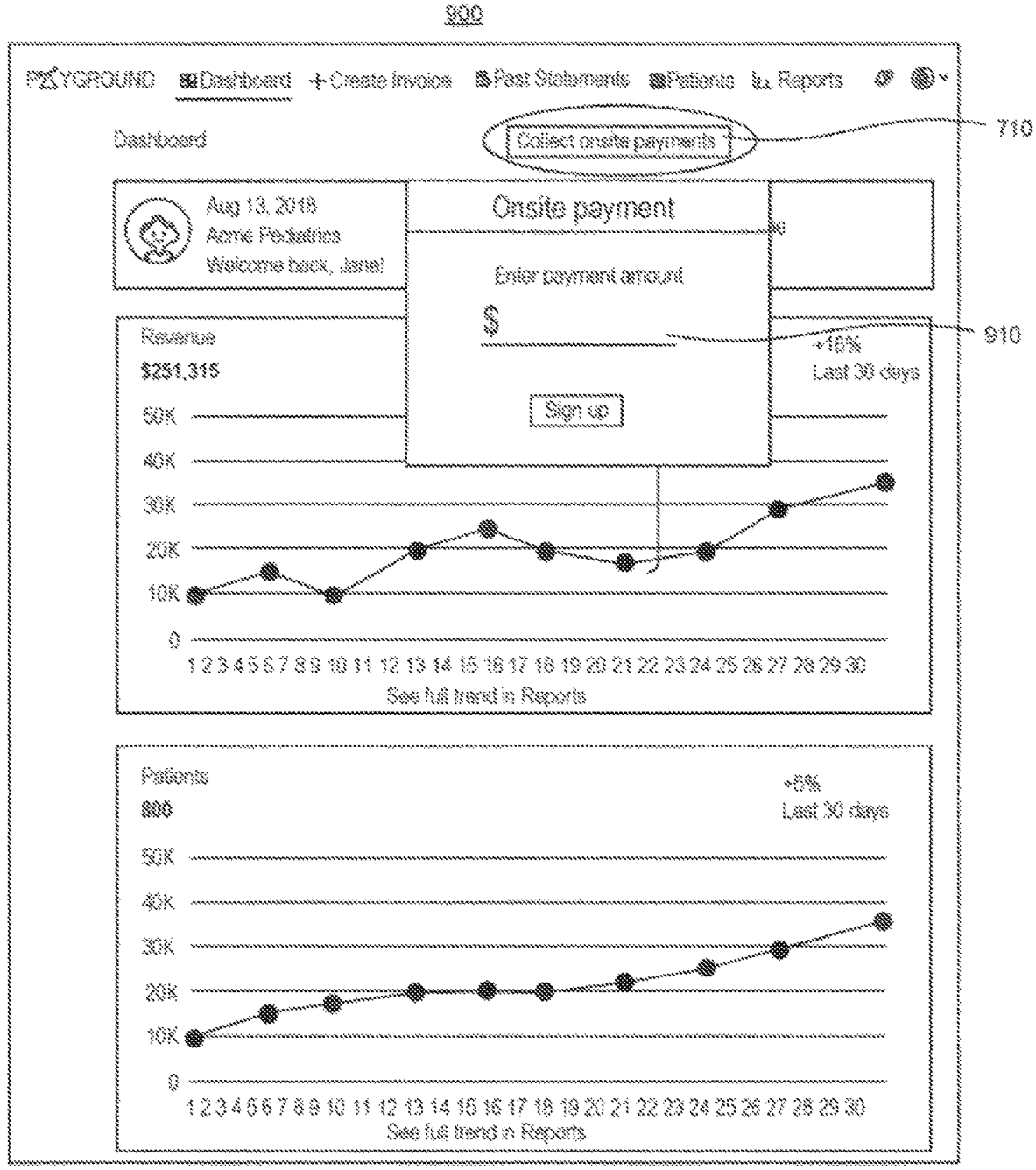
FIG. 9 illustrates a collect on-site payment dialog box in some embodiments.

FIG. 9 illustrates a collect on-site payment dialog box in some embodiments. When a healthcare provider selects the collect on-site payment button, the HPPA system displays a dialog box 900. The dialog box allows the healthcare provider to enter a payment amount that is paid by the patient on-site at a medical facility identified on display page 800.

Figure 10:
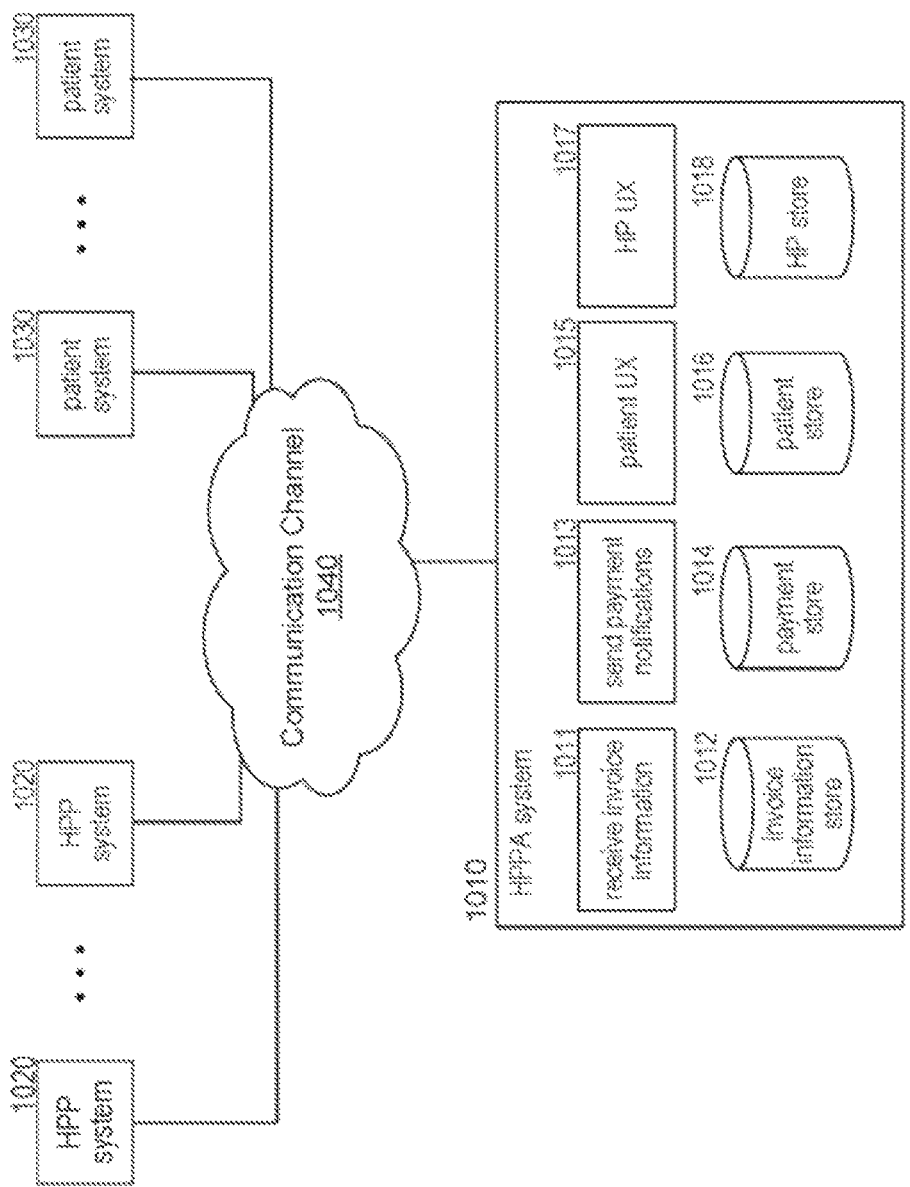
FIG. 10 is a block diagram that illustrates components of the HPPA system in some embodiments.

FIG. 10 is a block diagram that illustrates components of the HPPA system in some embodiments. The HPPA system 1010, HPP systems 1020, and patient systems 1030 communicate via communications channel 1040. The HPPA system includes a receive invoice information component 1011, a send payment notifications component 1013, a patient user experience component 1015, and a healthcare provider user experience component 1017. The HPPA system also includes an invoice information store 1012, a payment store 1014, a patient store 1016, and a healthcare provider store 1018. The receive invoice information component 1011 receives invoices from the HPP systems 1020 and stores the invoice information in the invoice information store 1012. The send payment notifications component 1013 sends payment notifications to the HPP systems 1020 based on payments recorded in the payment store 1014. The patient user experience component 1015 provides display pages to patients based on information stored in the invoice information store 1012, payment store 1014, and patient store 1016. The healthcare provider user experience component 1017 controls the user experience for a healthcare provider 212 and stores invoice and payment in the healthcare provider store 1018. The healthcare provider user experience component 1017 may also be implemented on an HPP system 1020.

The computing systems (e.g., network nodes or collections of network nodes) on which the HPPA system 1010 (shown, e.g., in FIG. 10), as well as the MTSCUS system 1200 (shown, e.g., in FIGS. 12A-12C), may be implemented or may include a central processing unit or processor 1206, input devices, output devices (e.g., display devices and speakers), storage devices (e.g., memory and disk drives, database 1204), network 1210, network interfaces, graphics processing units, cellular radio link interfaces, global positioning system devices, and so on. Multiple processors and/or multiple buses may be used, as appropriate, along with multiple memories and/or types of memory. Also, a plurality of machines may be coupled together, with each device providing portions of the necessary operations (e.g., as a server bank, a group of blade servers, and/or a multi-processor system). The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants (PDAs), smartphones, gaming devices, servers, blade servers, mainframes, and/or a group of such servers, and/or other appropriate computers and so on. The components shown or described, their connections, couples, and relationships, and their functions, are meant to be exemplary only, and are not meant to limit the embodiments described and/or claimed, according to an embodiment.

The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The memory or memory 1208 may be a volatile memory or non-volatile memory. The memory 72 may also be another form of computer-readable medium, such as a magnetic and/or an optical disk. The storage device or storage may be capable of providing mass storage. In an embodiment, the storage device or storage may be includes a floppy disk device, a hard disk device, an optical disk device, a tape device, a flash memory and/or other similar solid-state memory device. In another embodiment, the storage device may be an array of the devices in a computer-readable medium previously mentioned heretofore, computer-readable medium, such as, and/or an array of devices, including devices in a storage area network and/or other configurations. A computer program may be comprised of instructions that, when executed, perform one or more methods, such as those described herein. The instructions may be stored in the memory, the storage device or storage, a memory coupled to the processor, and/or a propagated signal. The computer-readable storage media may have recorded on them or may be encoded with computer-executable instructions or logic that implements the HPPA system. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The HPPA system may be described in the general context of computer-executable instructions, such as program modules and components, executed by one or more computers, processors, or other devices. Generally, program modules or components include routines, programs, objects, data structures, and so on that perform tasks or implement data types of the HPPA system. Typically, the functionality of the program modules may be combined or distributed as desired in various examples. Aspects of the HPPA system may be implemented in hardware using, for example, an application-specific integrated circuit ("ASIC") or field programmable gate array ("FPGA").

The systems and techniques described here may be implemented in a computing system that includes a back-end component (e.g., as a data server), a middleware component (e.g., an application server), a front-end component (e.g., a client computer having a graphical user interface, and/or a Web browser through which a user can interact with an embodiment of the systems and techniques described here), and a combination thereof. The components of the system may also be coupled through a communication network. The communication network or network 1210 may include a local area network ("LAN") and a wide area network ("WAN") (e.g., the Internet). The computing system can include a client and a server. In an embodiment, the client and the server are remote from each other and interact through the communication network.

Figure 11:
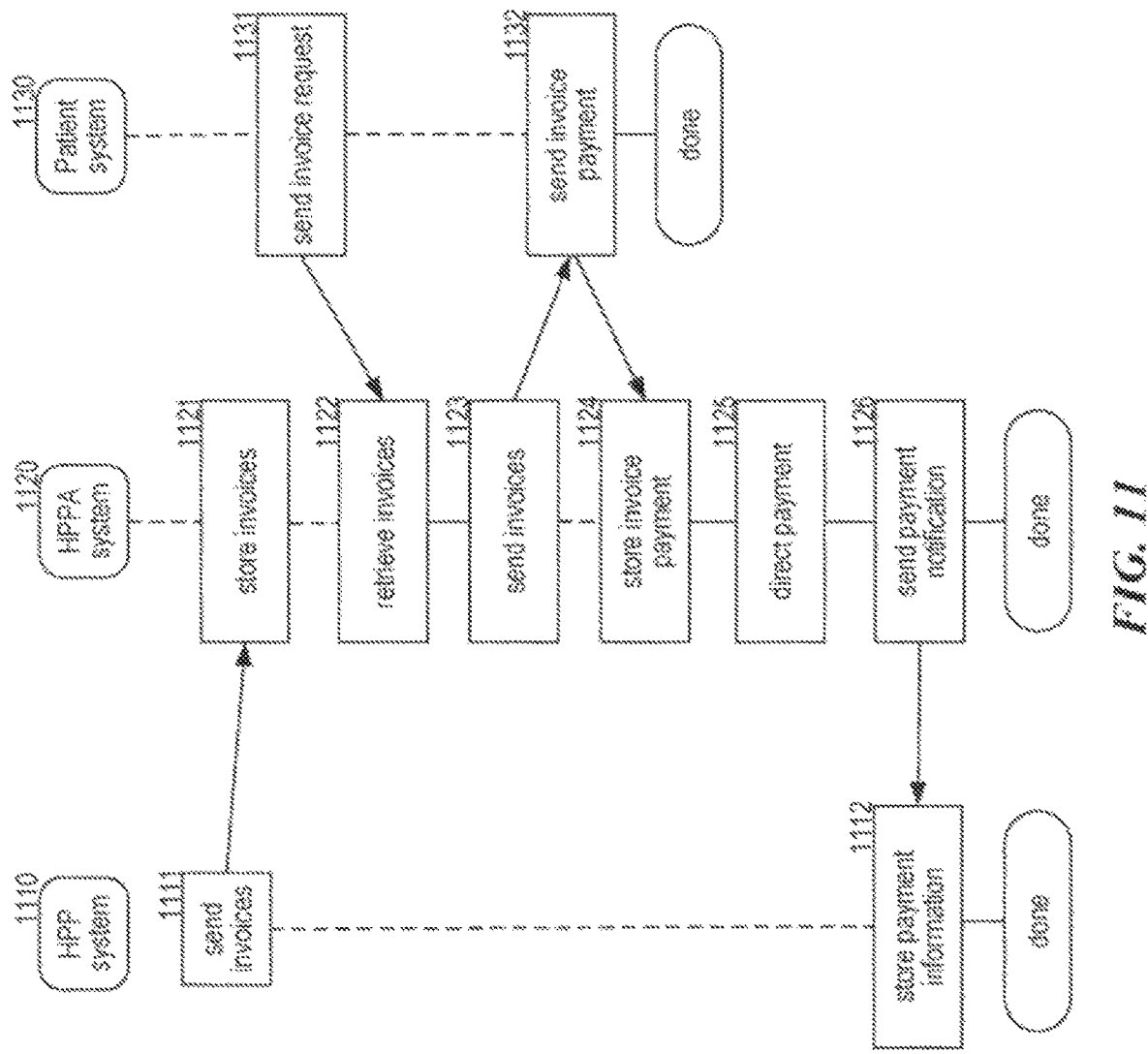
FIG. 11 illustrates flow diagrams of the processing of various systems of a HPPA service in some embodiments.

FIG. 11 illustrates flow diagrams of the processing of various systems of a HPPA service in some embodiments. Flow diagram 1110 illustrates the processing of an HPP system, flow diagram 1120 illustrates the processing of HPPA system, and flow diagram 1130 illustrates the processing of a patient system. Initially, the HPP system sends 1111 invoices to the HPPA system. Upon receiving invoices, the HPPA system stores 1121 the invoices in the invoice information store. In response to receiving a request to retrieve invoices, the patient system sends 1111 the request to the HPPA system 1120. Upon receiving the request, the HPPA system 1120 retrieves 1122 invoices from the invoice information store. The HPPA system then sends 1123 the retrieved invoices to the patient system. Upon receiving the invoices, the patient system receives payment authorization from a patient and sends 1132 the authorization to the HPPA system. Upon receiving the notification, the HPPA system stores 1124 invoice payment information in the payment store. The HPPA system then directs 1125 payment to be made to the healthcare provider. The HPPA system then sends payment notification to the HPP system. Upon receiving the payment notification, the HPP system stores 1112 payment information in the payment store and completes the process.

Figure 12A:
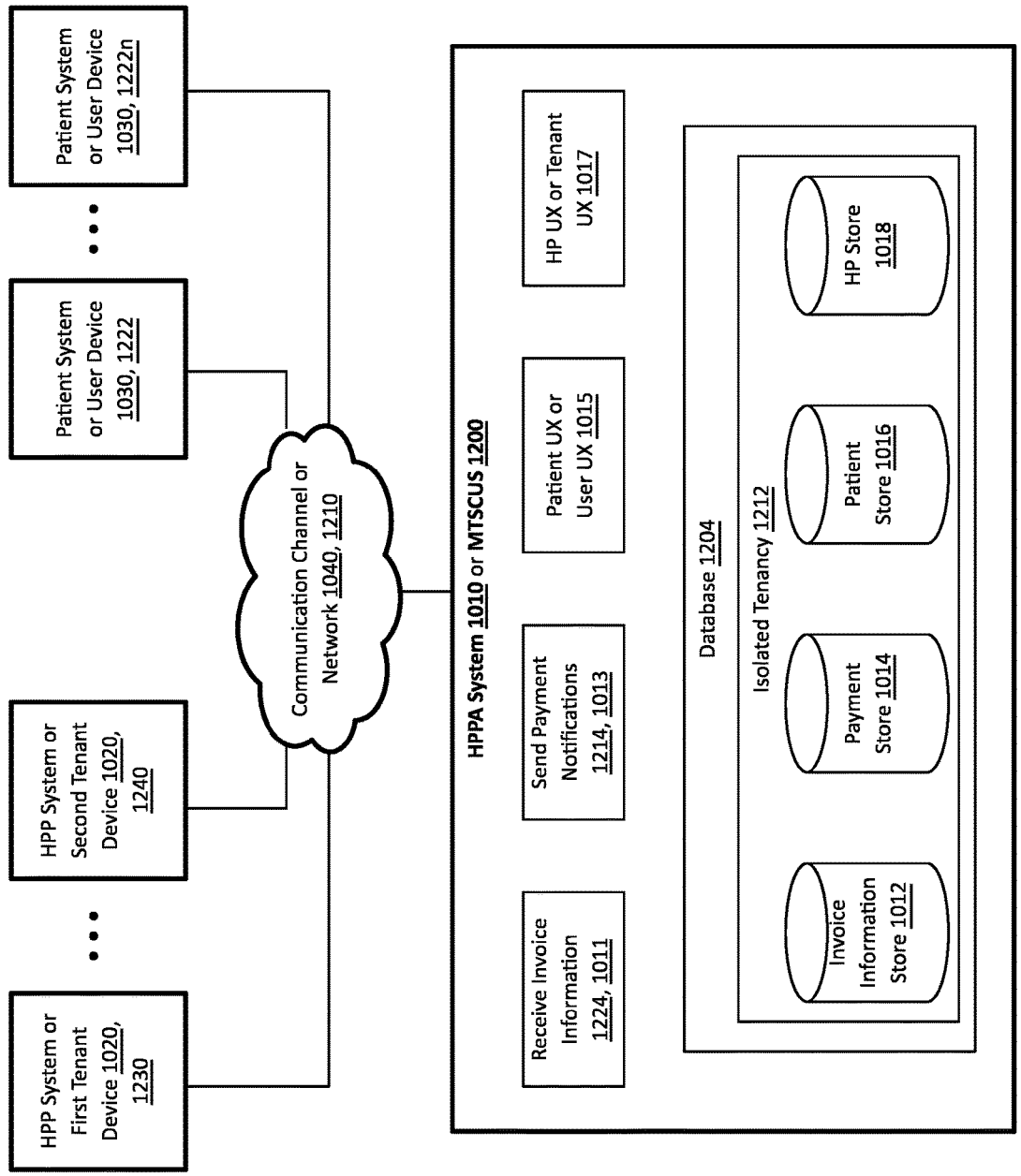
FIGS. 12A-12C illustrate various flow diagrams of a HPPA system or multi-tenant system for consolidated user services.
Figure 12B:
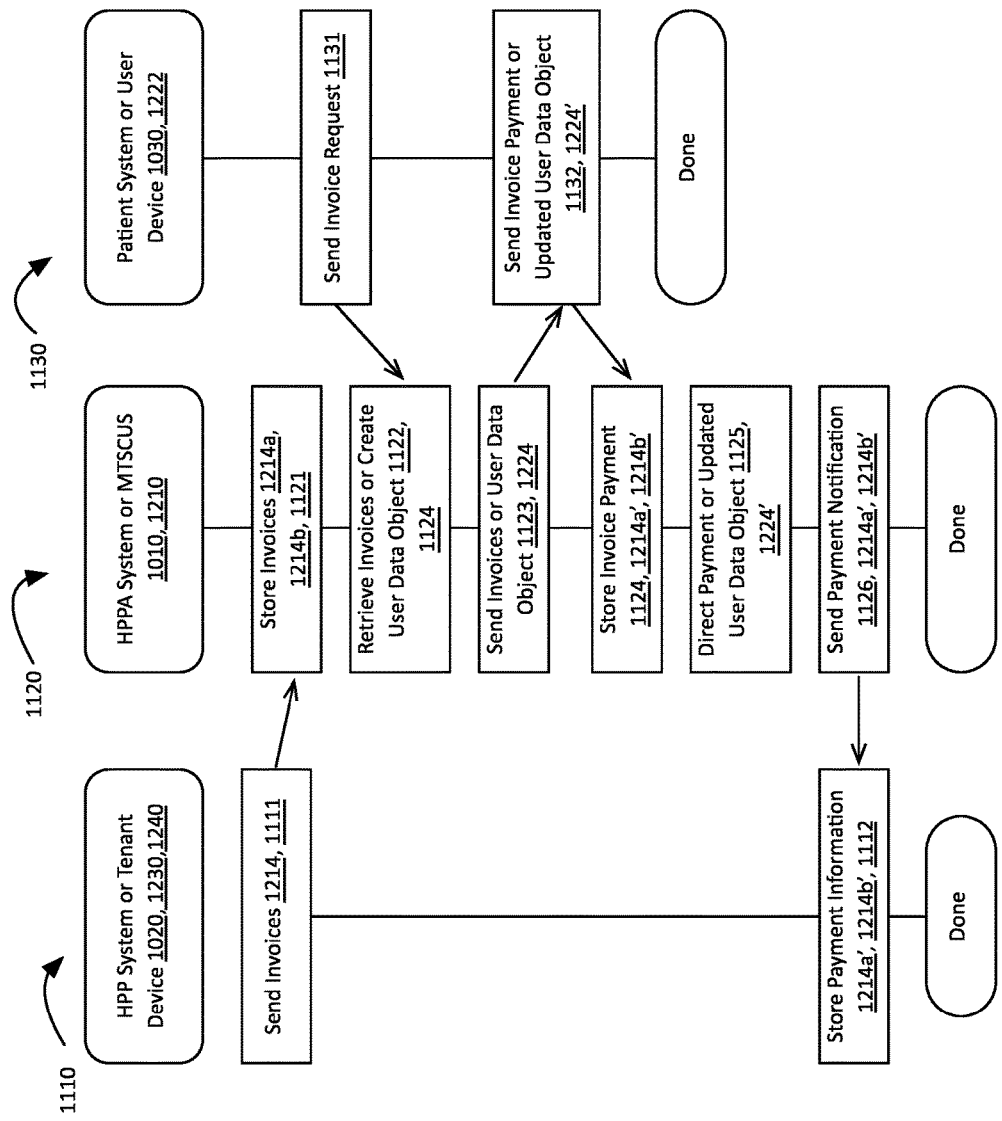
Figure 12C:
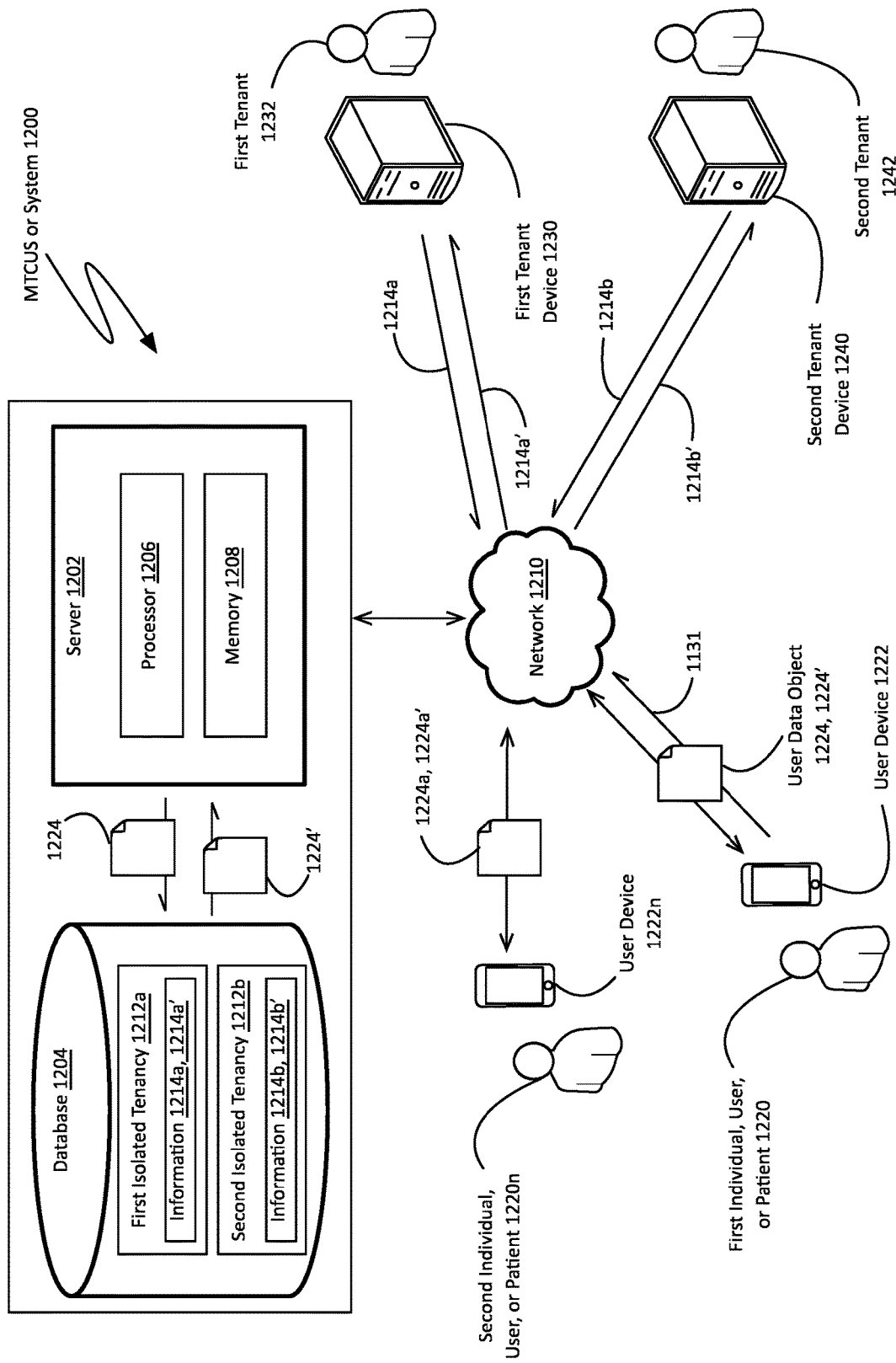

FIGS. 12A-12C illustrate various flow diagrams of HPPA systems 1010 or MTSCUS 1200. FIG. 12A is a block diagram that illustrates components of the HPPA system 1010 or MTSCUS 1200 in some embodiments. The HPPA system 1010 or MTSCUS 1200, HPP systems 1020 or tenant devices 1230, 1240, and patient systems 1030 or user devices 1022, $1022n$, $1022_{n+1}$ communicate via communications channel 1040 or network 1210. The HPPA system 1010 or MTSCUS 1200 includes a receive invoice information component 1011, a send payment notifications component 1013, a patient or user experience component 1015, and a healthcare provider or tenant user experience component 1017. The HPPA system 1010 or MTSCUS 1200 also includes a number of stores that may operate as part of the database 1204 or as part of one or more tenancies 1212, such as: an invoice information store 1012, a payment store 1014, a patient store 1016, and a healthcare provider store 1018. The receive invoice information component 1011 receives invoices from the HPP systems 1020 or tenant devices 1230, 1240 and stores the invoice information in the database 1204, an isolated tenancy 1212, or an invoice information store 1012. The send payment notifications component 1013 sends payment notifications to the HPP systems 1020 or tenant devices 1230, 1240 based on payments recorded in the payment store 1014. The patient or user experience component 1015 provides display pages to patients or users based on information stored in the database 1204, an isolated tenancy 1212, or the invoice information store 1012, payment store 1014, and patient store 1016. The tenant or healthcare provider user experience component 1017 controls the user experience for a tenant or healthcare provider and stores invoice and payment in the database 1204, an isolated tenancy 1212, or the healthcare provider store 1018. The healthcare provider user experience component 1017 may also be implemented on an HPP system 1020 or tenant devices 1230, 1240.

FIG. 12B illustrates flow diagrams of the processing of various systems of services, including an HPPA service 1010 or MTSCUS 1200 in some embodiments. The left portion of FIG. 12B is a flow diagram 1110 that illustrates the processing of an HPP system 1020 or tenant device 1230, 1240. The middle portion of FIG. 12B is a flow diagram 1120 that illustrates the processing of HPPA system 1010 or MTSCUS 1200. The right portion of FIG. 12B is a flow diagram 1130 that illustrates the processing of a patient system 1030 or user device 1222. Initially, the HPP system 1020 or tenant device 1230, 1240 sends invoices 1111 or information 1214 to the HPPA system 1010 or MTSCUS 1200. Upon receiving invoices, the HPPA system 1010 or MTSCUS 1200 stores 1121 the invoices or information 1214 in the invoice information store or tenancy 1212. In response to receiving a request to retrieve invoices, the patient system 1030 or user device 1222 sends 1111 the request to the HPPA system 1010 or MTSCUS 1200. Upon receiving the request 1111 (or an invoice request 1131), the HPPA system 1010 or MTSCUS

1200 retrieves 1122 invoices or user data object 1124 from the invoice information store, database 1204, including multiple tenancies 1212. The HPPA system 1010 or MTSCUS 1200 then sends 1123 the retrieved invoices to the patient system 1030 or user device 1222. Upon receiving the invoices or user data object 1224, the patient system 1030 or user device 1222 receives payment authorization from a patient or user 1220 and sends 1132 the authorization or updated user data object 1224' to the HPPA system 1010 or MTSCUS 1200. Upon receiving the notification or updated user data object 1124', the HPPA system 1010 or MTSCUS 1200 stores 1124 invoice payment information or the updated user data object 1224' in the payment store 1014, or database 1204, including in one or more (or at least two) isolated tenancies 1212a and 1212b. The HPPA system 1010 or MTSCUS 1200 then directs 1125 payment to be made to the healthcare provider. The HPPA system 1010 or MTSCUS 1200 then sends payment notification to the HPP system 1020 or tenant device 1230, 1240. Upon receiving the payment notification, the HPP system 1020 or tenant device 1230, 1240 stores 1112 payment information in the payment store and completes the process.

FIG. 12C illustrates a block diagram that illustrates components and interactions of a MTSCUS system 1200 (which may comprise a HPPA system 1010), according to an embodiment. The MTSCUS 1200 may comprise a database 1204 comprising a number of tenancies or isolated tenancies 1212, such as a first isolated tenancy 1212a and a second isolated tenancy 1212b. As used herein, a tenancy or isolated tenancy 1212 comprises digital real estate only available to a specific tenant (such as a health care provider or tenant device 1230, 1240) and is secure/partitioned from other tenants. As such, a first tenant device 1230 may communicate with a multi-tenant object (e.g. 1340 in FIG. 13) within the database 1204 of MTSCUS system 1200 and securely access information available to it, the same information not being available to another or second tenant device 1240, for the same or related interactions or transaction (e.g. the creation of a composite or user data object 1224).

A server 1202 may be communicatively coupled to the database 1204, the server comprising a processor 1206 and a memory 1208. The server 1202 may be configured to receive information 1214a specific to a first individual, user, or patient 1220 from a first tenant device 1230 communicatively coupled to the server through a network 1210. The information 1214a specific to a first individual 1220 may comprise information restricted to the first individual 1220 and the first tenant 1232 (or the first tenant device 1230), and is not available to a second or additional individual, user, or patient 1220n nor the second tenant 1242 (or the second tenant device 1240).

The information 1214a specific to a first individual 1220 may comprise a bill or invoice or any information confidential or restricted to the first individual and the first tenant. The information 1214a specific to a first individual 1220 may be restricted according to a data privacy policy. The data privacy policy may comprise the United States Health Insurance Portability and Accountability Act (HIPAA), the European (EU) General Data Protection Regulation 2016/679 (GDPRE), or other international, national, local, corporate, or private, law, convention, regulation, statute, guideline, rule or policy.

The server 1202 may be configured to store the information 1214a specific to the first individual 1220 within the first isolated tenancy 1212a. The server 1202 may be configured to receive information 1214b specific to the first individual 1220 from a second tenant device 1240 communicatively coupled to the server 1202 through the network 1210. The server 1202 may be configured to store the information 1214a specific to the first individual 1220 within the first isolated tenancy 1212a. The server 1202 may be configured to consolidate the information 1214a, 1214b specific to the first individual 1220 from the first isolated tenancy 1212a and the second isolated tenancy 1212b to create a user data object 1224 specific to the first individual 1220. The server 1202 may be configured to send the user data object 1224 to a first user device 1222 communicatively coupled to the server 1202 through the network 1210.

The user data object 1224 may comprise consolidated information or data (including but not limited to a combined medical invoice for services from multiple medical providers) from multiple sources or tenants 1230, 1240. The consolidated information or user data object 1224 will be relevant to a particular user, like the first user 1220, and further contains information that is consolidated from multiple sources or tenants 1230, 1240 (including but not limited to a first and second healthcare provider) that should not have access to the consolidated data, or the data from the other tenants relating to the user 1220.

While the description of FIG. 12C has focused on an interaction within the MTSCUS 1200 involving one user 1220 and two tenants 1232, 1242, a POSA will appreciate that hundreds, thousands, and more, of both users 1220, 1220n, 1220$_{n+1}$ and tenants 1232, 1242, etc. may interact with multiple user data objects 1224 being created for a plurality of unique transactions, each involving different confidential information, users, and tenants.

Figure 13:
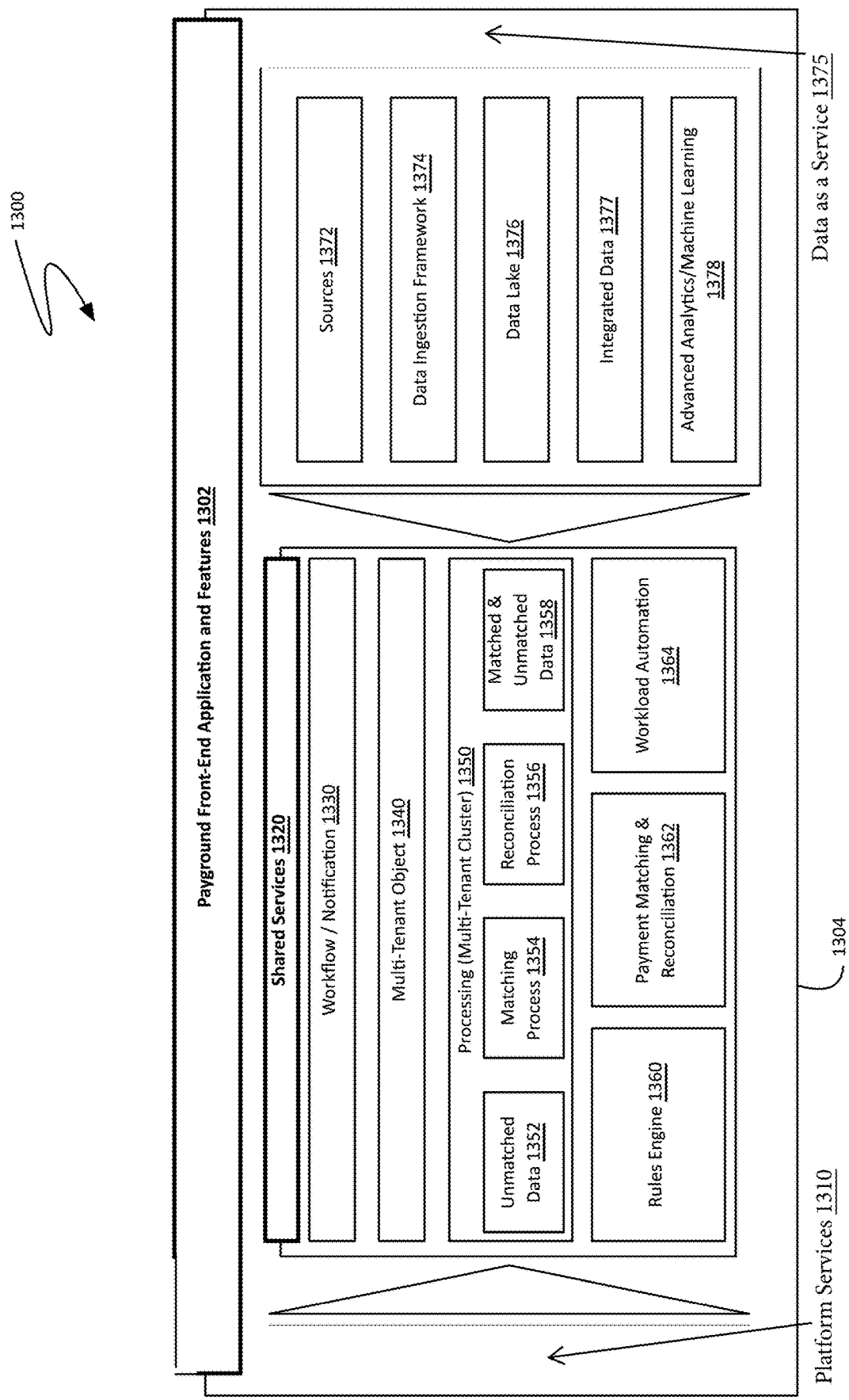
FIG. 13 illustrates system components or architectures for a HPPA system or multi-tenant system for consolidated user services.
Figure 14:
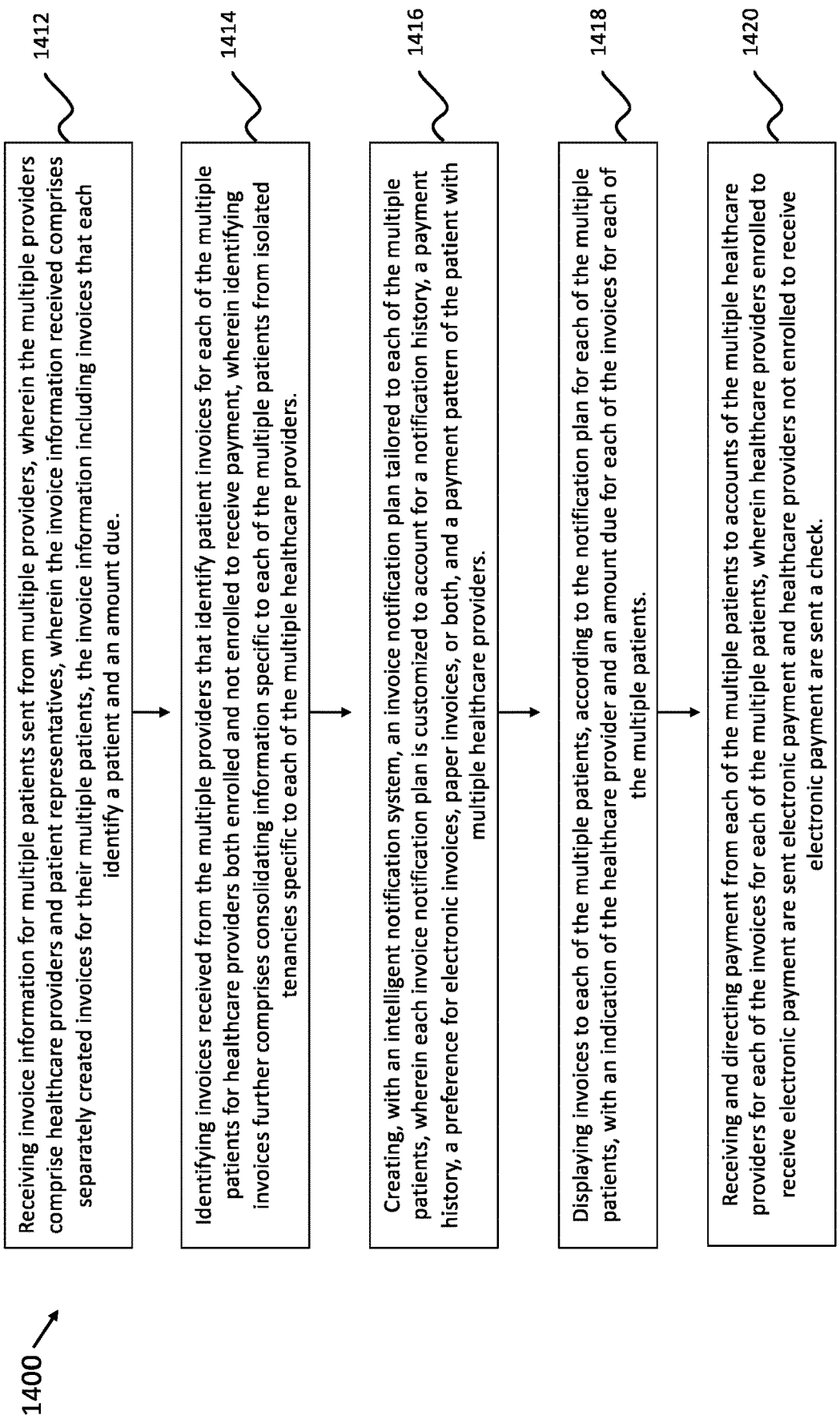
FIG. 14 illustrates a method performed by a multi-tenant system for consolidated user services configured as a healthcare billing and payment aggregation service.

FIG. 13 illustrates system components or architecture 1300 for a HPPA system 1010 or MTSCUS 1200. More specifically, the system architecture 1300 may comprise front-end application features 1302, and back-end application features 1304, which may be all the features that are not front-end features, and that are included within the dashed box shown in FIG. 13, and are tied into, or interact with, the front-end features 1302. The front-end application features 1302 may include, for example, one or more of the following features and functions: administration and configuration, user management, defining hierarchies, setup matching rules, schedule ingestion and matching process, and reconciliation workflow processes. The front-end application features 1302 may further include, for example, one or more of the following features and functions: payments, invoicing and e-invoicing, accounts receivable (AR), reporting and dashboards, and data extracts.

The back-end services 1304 may be broadly grouped into three areas or types: platform services 1310 (shown at the left of FIG. 13), shared services 1320 (shown at the center of FIG. 13), and Data as a Services 1375 (shown at the right of FIG. 13). Platform services 1310 may comprise one or more of such services as: messaging services, API microservices, serverless functions, containerization, service discovery, API Gateways, and transactional data.

Shared services 1320 may comprise workflow notification 1330, a multi-tenant object 1340, processing with a multi-tenant cluster 1350, which may further comprise unmatched data 1352, matching process 1354, reconciliation process 1356, and matched and unmatched data 1358. The shared services 1320 may further comprise rules engine 1360, which may store and apply both business rules and a rules database, payment matching and reconciliation, which may include matching templates 1362, and workload automation 1364.

Shared services 1320 may provide capabilities to share across different tenants1230, 1240 or healthcare providers, only will only be shared if approved to be shared. The data within shared services 1320 may be ingested and shared within the platform or system 1300, during which process the data files may go through several steps to standardize the data into a form that will be used within the system 1300. Other multi-tenant systems, even enterprise level multi-tenant systems like Salesforce, for security, are structured differently than system 1300, in which information and access is secure and separate for each tenant 1230, 1240, or provider or HPP 1020 (also referred to as a "provider" for ease of description). In system 1300, which is an exemplary architecture of MTCUS 1200, each provider has isolated data that is not comingled or is separated, whether physically, on different logical layers, or in another suitable way. The data may be segregated by tenant or provider, but the services that process the data are shared because the services do not store the data, bur are instead just engines that process the data and talk to multiple data stores. In this way, the system can update customer, user, or patient information within the model using an architecture that is very unique from other systems and architecture procedures.

Data as service (DAS) 1375, as shown on the right side of FIG. 13, may include one or more of the following features: sources of data 1372, a data ingestion framework 1374, a data lake 1376, integrated data 1377, and advanced analytics and machine learning 1378. DAS 1375 may provide value to users, patients, and tenants from a data perspective, with new and improved functionality regarding analytics, reporting, and the sharing and using data for other, or related, purposes. The data ingestion framework 1374 may be driven by integration with artificial intelligence (AI). Sources of data 1372 may include point of sale (POS) transactions, payments (such as debit and credit payments), and accounts receivable.

The data lake 1376 may include raw data, data profiling, metadata and definitions, mappings and rules for data, as well as a raw data store. The data lake 1376 may operate by ingesting all the files into a huge repository, mask data, strip out patient identifiable information, and organize and use various states of the data for other purposes and to improve various processes. Integrated Data 1377 may include an integrated data warehouse, data certified for business self-service, reference data, multi-tenant marts by client, and a matching and reconciliation DataMart. Advanced analytics and machine learning 1378 may include machine learning models and deep learning models, which may provide insight and help understand patient behavior in the aggregate.

The following paragraphs describe various embodiments of aspects of a MTSCUS system, such as a HPPA system. An implementation of the HPPA system may employ any combination of the embodiments. The processing described below may be performed by a computing system with a processor that executes computer-executable instructions stored on a computer-readable storage medium that implements the message interface system.

In some embodiments, a method performed by one or more computing systems of a healthcare payment aggregation service is provided. The method receives invoice information sent from a plurality of healthcare providers. The healthcare providers that separately create invoices their patients. The invoice information includes invoices that each identifies a patient and an amount due. The method receives a request from a user to access their invoices. The method identifies invoices received from multiple healthcare providers that identify the user as the patient. The method displays an indication of the healthcare provider and amount due of one or more the identified invoices. The method receives from the user an instruction to pay the amount due of a designated invoice of the displayed invoices. The method directs that payment for the amount due of the designated invoice be transferred from an account of the user to an account of the healthcare provider of the designated invoice. The method notifies the healthcare provider of the designated invoice of the payment. In some embodiments, the method receives from another user a request to pay a patient-provided invoice that has not been received from a specified healthcare provider by the healthcare payment aggregation service. The request identifies a payment amount and the specified healthcare provider. The method directs that payment for the payment amount due be transferred from an account of the other user to an account of the specified healthcare provider. The method notifies the specified healthcare provider of the payment for the patient-provided invoice. In some embodiments, the request to pay the patient-provided invoice identifies the specified healthcare provider, and the notifying of the specified healthcare provider identifies the patient-provided invoice. In some embodiments, each invoice includes an invoice identifier, and the notifying includes providing the invoice identifier of the designated invoice to the healthcare provider. In some embodiments, the method further when a user specifies to automatically pay invoices of a specified healthcare provider, the method after a specified invoice for the specified healthcare provider is received, directs that payment for the amount due of the specified invoice be transferred from an account of the user to an account of the specified healthcare provider. The method then notifies the specified healthcare provider of the payment.

In some embodiments, one or more computing systems of a healthcare payment aggregation service are provided for providing a user experience for payment of healthcare providers that are not affiliated with each other for invoicing purposes. The one or more computing systems include one or more computer-readable storage mediums storing computer-executable instructions and one or more processors for executing the computer-executable instructions stored in the one or more computer-readable storage mediums. The instructions control the one or more computing systems to display to a user a dashboard display page that identifies one or more pending invoices for different healthcare providers, that identifies recent payments to different healthcare providers whose invoices are handled by separate invoicing systems, and that provides payment statistics. The instructions control the one or more computing systems to display to the user an invoices pending display page through which the user can review pending invoices including invoices from different healthcare providers and pay an invoice. The instructions control the one or more computing systems to display to the user a healthcare providers display page through which the user can review authorized healthcare providers for which the user has authorized the healthcare aggregation service to receive invoices of the user and through which the user can authorize and de-authorized healthcare providers. In some embodiments, the computer-executable instructions further control the one or more computing systems to receive a selection of an invoice and coordinate payment of the invoice. In some embodiments, the computer-executable instructions further control the one or more computing systems to upon receiving a selection of an invoice, automatically paying the invoice based on previously stored payment information. In some embodiments, the computer-executable instructions further control the one or more computing systems to display a display page through which the user can designate a healthcare provider whose invoice information for the user is to be sent to the healthcare payment aggregation service.

In some embodiments, one or more computing systems that provide a healthcare payment aggregation service are provided. The one or more computing systems include one or more computer-readable storage mediums storing computer-executable instructions and one or more processors for executing the computer-executable instructions stored in the one or more computer-readable storage mediums. The computer-executable instructions further control the one or more computing systems to receive invoice information sent from different healthcare provider computer systems of different healthcare providers. The invoice information includes invoices that each identifies a healthcare provider, a patient and an amount due. The invoice information of at least two healthcare providers are not provided by the same computer system. The computer-executable instructions further control the one or more computing systems to identify invoices received from multiple healthcare provider computer systems that identify the user as the patient. The computer-executable instructions further control the one or more computing systems to receive from the user an instruction to pay the amount due of invoices. The computer-executable instructions further control the one or more computing systems to direct that payment for the amount due of an identified invoice be transferred from an account of the user to an account of the healthcare provider of the identified invoice. The computer-executable instructions further control the one or more computing systems to notify the healthcare provider of the identified invoice of the payment. In some embodiments, the computer-executable instructions further control the one or more computing systems to display an indication of the identified invoice and receive from the user an indication to pay the invoice. In some embodiments, the computer-executable instructions further control the one or more computing systems to automatically direct payment based on receiving the identified invoice. In some embodiments, the computer-executable instructions further control the one or more computing systems to receive from another user a request to pay a patient-provided invoice that has not been received from a specified healthcare provider by the healthcare payment aggregation service. The request identifies a payment amount and the specified healthcare provider. The computer-executable instructions further control the one or more computing systems to direct that payment for the payment amount due be transferred from an account of the other user to an account of the specified healthcare provider. The computer-executable instructions further control the one or more computing systems to notify the specified healthcare provider of the payment for the patient-provided invoice. In some embodiments, the request to pay the patient-provided invoice identifies the specified healthcare provider, and the notifying of the specified healthcare provider identifies the patient-provided invoice. In some embodiments, each invoice includes an invoice identifier, and the notifying includes providing the invoice identifier of the identified invoice to the healthcare provider. In some embodiments, the computer-executable instructions further control the one or more computing systems to send electronic notifications to patients to inform the patients when invoices are received. In some embodiments, the computer-executable instructions further control the one or more computing systems to send electronic notifications of invoices followed by paper notifications while an invoice is not paid. In some embodiments, the computer-executable instructions further control the one or more computing systems establish a notification plan of sending electronic notification and paper notifications based on a history of a patient in responding to notifications. In some embodiments, the computer-executable instructions further control the one or more computing systems to learn the payment pattern of a patient based on applying different notification plans. In some embodiments, the notification plan is established based on history of a patient in responding to notifications of different healthcare providers.

In some embodiments, a method performed by one or more computing systems of a service payment aggregation service is provided. The method receives invoice information sent from a plurality of service providers. The service providers that separately create invoices their service recipients. The invoice information includes invoices that each identifies a service recipient and an amount due. The method receives a request from a user to access their invoices. The method identifies invoices received from multiple service providers that identify the user as the service recipient. The method displays an indication of the service provider and amount due of one or more the identified invoices. The method receives from the user an instruction to pay the amount due of a designated invoice of the displayed invoices. The method directs that payment for the amount due of the designated invoice be transferred from an account of the user to an account of the service provider of the designated invoice. The method notifies the service provider of the designated invoice of the payment. In some embodiments, the method receives from another user a request to pay a service recipient-provided invoice that has not been received from a specified service provider by the service payment aggregation service. The request identifies a payment amount and the specified service provider. The method directs that payment for the payment amount due be transferred from an account of the other user to an account of the specified service provider. The method notifies the specified service provider of the payment for the service recipient-provided invoice. In some embodiments, the request to pay the service recipient-provided invoice identifies the specified service provider, and the notifying of the specified service provider identifies the service recipient-provided invoice. In some embodiments, each invoice includes an invoice identifier, and the notifying includes providing the invoice identifier of the designated invoice to the service provider. In some embodiments, the method further when a user specifies to automatically pay invoices of a specified service provider, the method after a specified invoice for the specified service provider is received, directs that payment for the amount due of the specified invoice be transferred from an account of the user to an account of the specified service provider. The method then notifies the specified service provider of the payment.

In an aspect, a method 1400 performed by the MTSCUS 1200 configured as a healthcare billing and payment aggregation service may comprise receiving invoice information for multiple patients 1220, 1220n, sent from multiple providers or healthcare providers 212. The multiple providers may comprise healthcare providers and patient representatives. As used herein, a patient representative comprises the patient 1220, a guardian, steward, or other entity with power of attorney to act on behalf of the patient, including an insurance company or third-party that is authorized to transact payment for the patient. The invoice information received 1412 may comprise separately created invoices for their multiple patients. The invoice information 302 may include invoices that each identify a patient 1220 and an amount due 321. Invoice information 302 may further comprise an invoice number, payment information, and amount. The method may include identifying invoices 1414 received from the multiple providers that identify patient invoices for each of the multiple patients for healthcare providers both enrolled and not enrolled to receive payment. Identifying invoices may further comprise consolidating information specific to each of the multiple patients from isolated tenancies 1212 specific to each of the multiple healthcare providers 212. The method may include, creating 1416, with an intelligent notification system 1110, an invoice notification plan 1214, 1111 tailored to each of the multiple patients 1220n or patient representatives. Each invoice notification plan may be customized to account for a notification history, a payment history, a preference for electronic invoices, paper invoices, or both, and payment pattern of the patient with multiple healthcare providers. The method may include displaying invoices 1418 to each of the multiple patients, according to the notification plan for each of the multiple patients, with an indication of the healthcare provider and an amount due for each of the invoices for each of the multiple patients. The method may include receiving and directing payment 1420 from each of the multiple patients to accounts of the multiple healthcare providers for each of the invoices for each of the multiple patients. Healthcare providers may be enrolled to receive electronic payment and healthcare providers not enrolled to receive electronic payments may be sent a check.

The method 1400 may further comprise a method wherein each invoice notification plan is customized to account for a notification history, a payment history, a preference for electronic invoices, paper invoices, or both, and a payment pattern of the patient with multiple healthcare providers. The method 1400 may further comprise notifying each of the plurality of healthcare providers of the payment of each of the invoices by each of the multiple patients. The electronic transfer of funds may come from a check processor different than an institution listed on the check by the payor. The check processor may be a third-party check processor. The multiple healthcare providers for each of the invoices for each of the multiple patients may receive payment due from the invoice notification plan by the electronic transfer of funds, and the third-party check processor may receive an amount of funds designated by the check from the check payor to offset the electronic transfer of funds advanced by the check processor to the payee. The electronic transfer of funds in lieu of the check may be less than a check amount, and the difference between an amount of the electronic transfer and the check amount may cover a processing fee of the check processor. The method 1400 may further comprise receiving from another user a request to pay a patient-provided invoice that has not been received from a specified healthcare provider by the healthcare payment aggregation service. The request may identify a payment amount and the specified healthcare provider. The method 1400 may include directing that payment for the payment amount due be transferred from an account of the other user to an account of the specified healthcare provider. The specified healthcare provider may be notified of the payment for the patient-provided invoice. The method 1400 may include directing that payment for the amount due of the specified invoice be transferred from an account of the user to an account of the specified healthcare provider when a user specifies to automatically pay invoices of a specified healthcare provider after a specified invoice for the specified healthcare provider is received. The specified healthcare provider may be notified of the payment.

Furthermore, in some instances receiving and detecting payment for at least one of the invoices may be made by providing payment in more than one installment or payments as part of a financing plan. The payment plan may be employed when the outstanding balance is large enough that a patient may be unable or hesitant to pay the entire balance, but is able and willing to make a payment that is a portion of (and less than a total of) the full outstanding balance due. In such cases, by making a financing plan available so that partial payments or installments may be paid, the healthcare provider can begin to collect some of the outstanding balance due, without needed to collect all of the outstanding balance due at once. Each healthcare provider can make its own determinations as to what time of financing or payment plans it will accept. Some payment plans may include limiting a term or time frame over which the payments may be made, such as a period of time not to exceed 3, 6, 12, or any desirable number of months. In some instances, financing may only be available for balances larger than a predetermined amount. Financing options may also be dependent on, or conditional with respect to, a patient (or payees) payment history, credit score, or other desirable criteria. In other instances, a third-party or lending institution can provide additional financing options, such as when the service provider does not offer payment plans, or lower installment payments. In such cases, the third-party lending institution can pay the service provider, so as to pay off an amount in full, and then collect on the advanced fees from the patient or patient representative with interest or according to a desired arrangement.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other methods could be intermixed or substituted with those provided. In places where the description above refers to particular methods, it should be readily apparent that a number of modifications may be made without departing from the spirit thereof and that these embodiments and implementations may be applied to other to educational technologies as well. Accordingly, the disclosed subject matter is intended to embrace all such alterations, modifications and variations that fall within the spirit and scope of the disclosure and the knowledge of one of ordinary skill in the art.

What is claimed is:

1. A method performed by a multi-tenant system for consolidated user services configured as a healthcare billing and payment aggregation service, the method comprising:
   receiving invoice information for multiple patients sent from multiple providers, wherein the multiple providers comprise healthcare providers and patient representatives, wherein the invoice information received comprises separately created invoices for their multiple patients, the invoice information including invoices that each identify a patient and an amount due, wherein the multi-tenant system comprises a database having a plurality of isolated tenancies, each isolated tenancy only available to a specific tenant and partitioned from other tenants, and wherein each of the multiple healthcare providers are tenants within the multi-tenant system, such that each healthcare provider is associated with a different isolated tenancy within the multi-tenant system, wherein each isolated tenancy comprises a partitioned data store accessible only to a corresponding tenant;
   storing invoice information from a first tenant in a first isolated tenancy associated with the first tenant, and storing invoice information from a second tenant in a second isolated tenancy associated with the second tenant;
   identifying invoices received from the multiple providers that identify patient invoices for each of the multiple patients for healthcare providers both enrolled and not enrolled to receive payment, wherein identifying invoices further comprises consolidating, into user data objects, information specific to each of the multiple patients from isolated tenancies specific to each of the multiple healthcare providers, wherein the user data object specific to a first patient of the multiple patients comprises information stored in the first isolated tenancy that is restricted to the first patient and the first tenant of the multi-tenant system and unavailable to a second patient and the second tenant of the multi-tenant system according to a data privacy policy and information stored in the second isolated tenancy that is restricted to the first patient and the second tenant of the multi-tenant system and unavailable to the second patient and the first tenant, where the first tenant and second tenant are healthcare providers;
   creating, with an intelligent notification system, an invoice notification plan tailored to each of the multiple patients, wherein each invoice notification plan is customized to account for a notification history, a payment history, a preference for electronic invoices, paper invoices, or both, and a payment pattern of the patient with multiple healthcare providers;
   displaying invoices to each of the multiple patients, according to the notification plan for each of the multiple patients, with an indication of the healthcare provider and an amount due for each of the invoices for each of the multiple patients; and
   receiving and directing payment from each of the multiple patients to accounts of the multiple healthcare providers for each of the invoices for each of the multiple patients, wherein healthcare providers enrolled to receive electronic payment are sent electronic payment and healthcare providers not enrolled to receive electronic payment are sent a check;
   wherein shared services are configured to process data from multiple tenancies without storing tenant-specific data and enable secure cross-tenant data aggregation in compliance with the data privacy policy.

2. The method of claim 1, wherein the data privacy policy is one of the United States Health Insurance Portability and Accountability Act (HIPAA) and the European (EU) General Data Protection Regulation 2016/679 (GDPRE).

3. The method of claim 1, further comprising notifying each of the plurality of healthcare providers of the payment of each of the invoices by each of the multiple patients.

4. The method of claim 1, wherein the electronic transfer of funds comes from a check processor different than an institution listed on the check by the payor.

5. The method of claim 1, wherein receiving and detecting payment for at least one of the invoices is made in more than one payments as part of a financing plan.

6. The method of claim 1, wherein:
   the multiple healthcare providers for each of the invoices for each of the multiple patients receives payment due from the invoice notification plan by the electronic transfer of funds; and
   the third-party check processor receives an amount of funds designated by the check from the check payor to offset the electronic transfer of funds advanced by the check processor to the payee.

7. The method of claim 1, wherein the electronic transfer of funds in lieu of the check is less than a check amount, and wherein the difference between an amount of the electronic transfer and the check amount covers a processing fee of the check processor.

8. The method of claim 1, further comprising:
   receiving from another user a request to pay a patient-provided invoice that has not been received from a specified healthcare provider by the healthcare payment aggregation service, the request identifying a payment amount and the specified healthcare provider;
   directing that payment for the payment amount due be transferred from an account of the other user to an account of the specified healthcare provider; and
   notifying the specified healthcare provider of the payment for the patient-provided invoice.

9. The method of claim 1, further comprising:
   directing that payment for the amount due of the specified invoice be transferred from an account of the user to an account of the specified healthcare provider when a user specifies to automatically pay invoices of a specified healthcare provider after a specified invoice for the specified healthcare provider is received; and
   notifying the specified healthcare provider of the payment.

10. A method performed by a multi-tenant system for consolidated user services configured as a healthcare billing and payment aggregation service, the method comprising:
    receiving invoice information for multiple patients sent from multiple providers, wherein the invoice information received comprises separately created invoices for their multiple patients, the invoice information including invoices that each identify a patient and an amount due, wherein the multi-tenant system comprises a database having a plurality of isolated tenancies, each isolated tenancy only available to a specific tenant and partitioned from other tenants, wherein each isolated tenancy comprises a partitioned data store accessible only to a corresponding tenant;
    identifying invoices received from the multiple providers that identify patient invoices for each of the multiple patients for healthcare providers both enrolled and not enrolled to receive payment, wherein identifying invoices received from the multiple providers comprises consolidating, into user data objects, information specific to each of the multiple patients from isolated tenancies specific to each of the multiple healthcare providers, wherein the user data object specific to a first patient of the multiple patients comprises information restricted to the first patient and a first tenant of the multi-tenant system and unavailable to a second patient and a second tenant of the multi-tenant system according to a data privacy policy;

creating, with an intelligent notification system, an invoice notification plan tailored to each of the multiple patients;

displaying invoices to each of the multiple patients, according to the notification plan for each of the multiple patients, with an indication of the healthcare provider and an amount due for each of the invoices for each of the multiple patients; and receiving and directing payment from each of the multiple patients to accounts of the multiple healthcare providers for each of the invoices for each of the multiple patients, wherein healthcare providers enrolled to receive electronic payment are sent electronic payment and healthcare providers not enrolled to receive electronic payment are sent a check;

wherein shared services are configured to process data from multiple tenancies without storing tenant-specific data and enable secure cross-tenant data aggregation in compliance with the data privacy policy.

11. The method of claim 10, wherein each invoice notification plan is customized to account for a notification history, a payment history, a preference for electronic invoices, paper invoices, or both, and a payment pattern of the patient with multiple healthcare providers.

12. The method of claim 10, further comprising notifying each of the plurality of healthcare providers of the payment of each of the invoices by each of the multiple patients.

13. The method of claim 10, wherein the electronic transfer of funds comes from a check processor different than an institution listed on the check by the payor.

14. The method of claim 10, wherein the check processor is a third-party check processor.

15. The method of claim 10, wherein:

the multiple healthcare providers for each of the invoices for each of the multiple patients receives payment due from the invoice notification plan by the electronic transfer of funds; and the third-party check processor receives an amount of funds designated by the check from the check payor to offset the electronic transfer of funds advanced by the check processor to the payee.

16. The method of claim 10, wherein the electronic transfer of funds in lieu of the check is less than a check amount, and wherein the difference between an amount of the electronic transfer and the check amount covers a processing fee of the check processor.

17. The method of claim 10, further comprising:

receiving from another user a request to pay a patient-provided invoice that has not been received from a specified healthcare provider by the healthcare payment aggregation service, the request identifying a payment amount and the specified healthcare provider;

directing that payment for the payment amount due be transferred from an account of the other user to an account of the specified healthcare provider; and notifying the specified healthcare provider of the payment for the patient-provided invoice.

18. The method of claim 10, further comprising:

directing that payment for the amount due of the specified invoice be transferred from an account of the user to an account of the specified healthcare provider when a user specifies to automatically pay invoices of a specified healthcare provider after a specified invoice for the specified healthcare provider is received; and notifying the specified healthcare provider of the payment.

19. The method of claim 10, wherein receiving and detecting payment for at least one of the invoices is made in more than one payments as part of a financing plan.

20. The method of claim 10, wherein the data privacy policy is one of the United States Health Insurance Portability and Accountability Act (HIPAA) and the European (EU) General Data Protection Regulation 2016/679 (GDPRE).

* * * * *

UNITED STATES PATENT AND TRADEMARK OFFICE
CERTIFICATE OF CORRECTION

| | | |
|---|---|---|
| PATENT NO. | : 12,499,499 B2 | Page 1 of 1 |
| APPLICATION NO. | : 17/566543 | |
| DATED | : December 16, 2025 | |
| INVENTOR(S) | : Drew Mercer | |

It is certified that error appears in the above-identified patent and that said Letters Patent is hereby corrected as shown below:

On the Title Page

Item (63), "Continuation-in-part of application No. PCT/US2020/067549, filed on Dec.30,2020" should be -- Continuation-in-part of application No. PCT/US2020/067549, filed on Dec. 30, 2020, which is a continuation-in-part of application no. 16/730,084 filed December 30, 2019. --

Signed and Sealed this
Tenth Day of February, 2026

John A. Squires
*Director of the United States Patent and Trademark Office*